US006201996B1

United States Patent
Crater et al.

(10) Patent No.: US 6,201,996 B1
(45) Date of Patent: Mar. 13, 2001

(54) OBJECT-ORIENTED PROGRAMMABLE INDUSTRIAL CONTROLLER WITH DISTRIBUTED INTERFACE ARCHITECTURE

(75) Inventors: Kenneth C. Crater, North Grafton; Daniel L. Pierson, Hudson; William O. Schley, Holliston, all of MA (US)

(73) Assignee: Control Technology Corporationa, Hopkinton, MA (US)

( * ) Notice: Subject to any disclaimer, the term of this patent is extended or adjusted under 35 U.S.C. 154(b) by 0 days.

(21) Appl. No.: 09/087,045

(22) Filed: May 29, 1998

(51) Int. Cl.⁷ .................................................. G05B 11/32
(52) U.S. Cl. .................. 700/9; 700/69; 700/79; 700/96
(58) Field of Search .................... 700/9, 79, 95, 700/169, 18, 110, 17; 717/5; 345/349

(56) References Cited

U.S. PATENT DOCUMENTS

| 5,157,595 | * 10/1992 | Lovernich ................................ 700/7 |
| 5,159,673 | * 10/1992 | Sackmann et al. .................... 709/216 |
| 5,327,349 | 7/1994 | Hoste ...................................... 700/95 |
| 5,805,442 | 9/1998 | Crater et al. . |
| 5,929,855 | 7/1999 | Benton et al. ....................... 345/349 |
| 5,950,006 | * 9/1999 | Crater et al. .............................. 717/5 |
| 5,953,226 | 9/1999 | Mellish et al. ......................... 700/18 |
| 5,963,450 | 10/1999 | Dew ..................................... 700/168 |
| 5,975,737 | * 11/1999 | Crater et al. ............................. 700/9 |
| 5,997,167 | * 12/1999 | Crater et al. ........................... 700/79 |
| 6,038,486 | * 3/2000 | Saitoh et al. ........................... 700/96 |

FOREIGN PATENT DOCUMENTS

| 0822473A2 | 2/1998 | (EP) . |
| 0917034A1 | 5/1999 | (EP) . |
| 7325778A | 12/1995 | (JP) . |
| WO97/26587 | 7/1997 | (WO) . |
| WO98/50834 | 11/1998 | (WO) . |

OTHER PUBLICATIONS

Larsen, The Next Web Wave: Network Management, Data Communications, vol. 25, No. 1, pp. 31–34, Jan. 1996.
Momal, et al., "Using World–Wide Web for Control Systems," International Conference on Accelerator and Large Experimental Physics Control Systems, 1995.
Taylor et al., "A Telerobot on the World Wide Web," Nat. Conf. of Australian Robot Ass'n (1995).

* cited by examiner

*Primary Examiner*—William Grant
*Assistant Examiner*—Kidest Bahta
(74) *Attorney, Agent, or Firm*—Testa, Hurwitz & Thibeault LLP

(57) ABSTRACT

A controller capable of interacting with a remotely located computer has an object-oriented control structure facilitating remote access to data formatted in accordance with instructions defined by the controller. The control structure may be organized around a database of object items each associated with a control function. For each control function, the items include one or more procedures for performing an action associated with the control function, and one or more procedures for displaying data associated with the control function. The action procedures effectively define the controller's repertoire with respect to a particular control function. The display procedures comprise instructions retrievable and executable by the remotely located computer, causing display thereon of the data in a predetermined format (i.e., the format prescribed by the instructions). The controller facilitates selection and performance of actions in the database, and execution of the display procedure makes the display instructions accessible to the remotely located computer.

33 Claims, 13 Drawing Sheets

OBJECT-ORIENTED PROGRAMMABLE INDUSTRIAL CONTROLLER WITH DISTRIBUTED INTERFACE ARCHITECTURE

FIELD OF THE INVENTION

The present invention relates to industrial automation, and in particular to communication with and among programmable controllers for operating and monitoring industrial processes and equipment.

BACKGROUND OF THE INVENTION

Sophisticated industrial processes, such as oil refining, automobile assembly or power generation, require the cooperative execution of numerous interdependent tasks by many different pieces of equipment. The enormous complexity of ensuring proper task sequencing and management, which requires not only procedural logic but constant monitoring of equipment states to organize and distribute operations and detect malfunction, has resulted in the widespread adoption of programmable controllers. These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing. The "inputs" to a particular controller can extend beyond the sensed state of the equipment the controller directly operates to include, for example, its environment, the state of related machinery or the state of its controllers.

Control requirements become even more complex when different aspects of the same overall process are assigned to remotely situated equipment. Such configurations often require reliable, high-bandwidth serial communication links to provide the necessary interconnection and handle data transfer among controllers and the sensors relevant to their operation.

Key to the proper operation and maintenance of programmable controllers (as well as the equipment they manipulate) is periodic auditing of equipment and controller states. Ordinarily, process operation is monitored, at least intermittently, by supervisory personnel by means of one or more central management stations. Each station samples the status of controllers (and their associated sensors) selected by the operator and presents the data in some meaningful format.

U.S. Ser. No. 08/851,644, the disclosure of which is hereby incorporated by reference, described use of the Internet and, more particularly, the interactive capabilities made available by resources such as the World Wide Web (hereafter the "web") to enable the controllers that actually gather data to determine how it is presented to a remote viewer. By packaging the control data as part of a web page (so that it appears as a static display or as the displayed result of a dynamic, self-updating program executing on the monitoring computer), the data is displayed in an optimal manner without regard to the capabilities or limitations of the monitoring computer. This avoids the need to equip monitoring computers with specialized graphic capabilities, as well as the need for intensive, ongoing cooperation between engineers responsible for programming controllers and those who configure the computers that perform monitoring. Moreover, because Internet users are typically billed for connectivity at a single rate, the long-distance charges that would accrue through use of telephone lines for data communication are eliminated.

In accordance with the '644 application, an integrated control system comprises one or more controllers each equipped to perform a control function and to gather data (ordinarily from sensors) relevant to the control function. "Relevant" data includes, at a minimum, any information upon which control decisions are made or states shifted, but can also include information obtained from sensors not directly connected to the controller (e.g., involving other controlled machines) but which is nonetheless meaningful to supervisory personnel. For example, a chemical synthesis process may be carried out at a temperature controlled to stay within an operating range, but the optimal temperature may depend on the output of a previous process feeding into the synthesis; in this case, the temperature of the synthesis process as well as the output of the previous process are relevant control parameters with respect to the synthesis process.

Each controller contains appropriate hardware and software for gathering, storing, and formatting the relevant data in accordance with instructions executable by the remote computer. The remote computer, in turn, receives the data and instructions, and in executing the instructions, presents the data in the desired format. Most typically, the remote computer runs a "web browser," and the controller maintains a "web page" that it serves to the browser upon connection. The web page comprises markup instructions that the browser executes, and which determine the appearance of the web page on the browser. Controller data are sent either as part of the markup instructions, resulting in a static display (i.e., one that can change only upon reloading of the web page by the browser); or in the form of program instructions that execute within the browser and thereby produce a dynamic display. The program instructions may direct not only the manner in which data is displayed, but also its gathering and periodic update. Thus, an "applet" might cause temperature data to be displayed as a graphical representation of a thermometer, with the height of the rendered mercury column dynamically varying in proportion to data periodically obtained from the controller by the remotely located browser.

The approach described in the '644 application facilitates a complete window into the operation of one or more controllers and, therefore, the industrial equipment they operate. Remotely located personnel can monitor he efficiency or overall behavior of the equipment, perform diagnostic checks, or even effect certain maintenance operations. For widely dispersed control and supervisory operations, supervisory computers interact with the controllers over the Internet, with the controllers continuously connected to the Internet as "nodes." In local operations, the flexibility conferred by Internet formalisms can be retained on a restricted, internal network.

The program code that operates industrial controllers, including the manner in which they gather and update data, has traditionally been procedural in nature. As described in U.S. Ser. No. 08/964,998, the disclosure of which is hereby incorporated by reference, procedural languages suffer from certain disadvantages; for example, functions and routines that are repeated must be programmed repeatedly, raising the prospect of error and, as the program becomes complex, obscuring its overall operation by the welter of detail. Furthermore, the frequently intricate, interdependent nature of industrial equipment can render a simple step-by-step procedural framework inadequate for controlling processes with reliability. The controller must be provided with (and its programming must accommodate) routines for handling "exceptions" ranging from sluggish component operation to complete failure of vulnerable components. These routines may take the form of diagnostic or "exception-handling" procedures. As branches from the primary control sequence, such routines further complicate programming in procedural systems.

Accordingly, the '998 application discloses a more sophisticated yet conceptually simpler paradigm for representing machine operation at the control level, and for programming control systems capable of directing the operation of complex industrial equipment and/or processes. This involves use of an object-oriented framework to "encapsulate" functions, attributes, and procedures, incorporating these within objects representing the entities most naturally associated with the encapsulated items. In this way, those items are established only once and utilized as necessary. An object may correspond to a part of a machine, to the machine itself, or to a class of machines; hierarchically superior (and conceptually more general objects) may be defined so as to be composed of "instances" of subordinate objects. For example, a "machine" object would contain procedures defining machine operations that the associated controller effectuates, as well as information facilitating orderly and reliable execution of those procedures.

In an object-oriented system, closely related data and procedures are treated as a single entity rather than separately. This is achieved by means of an object manager, which includes a database system to manage and organize the data corresponding to these entities or "objects." Design and implementation of object managers is well-known in the art. Basically, an object is a data structure and a set of operations and functions that can access that data structure. The data structure may, for example, be represented as a "frame" having a plurality of "slots," each of which contains an "attribute" of the frame. Each computational operation (a function, procedure, etc.) that can access the data structure is typically called a "method" or an "action."

The database contains a series of pointers associating each object with the methods and attributes (hereafter "object items") making up the object; those items may be stored anywhere—in volatile memory, on a mass-storage device, or even on a separate machine connected via a network interface. By organizing the object items, the database effectively permits each object to carry its own structure and orchestrate its own behavior. This permits the object frame to be "encapsulated" within the object methods; that is, access to the frame is handled primarily or exclusively by the surrounding methods, thereby ensuring data independence. Furthermore, because only the associated methods access the internal data structure, data integrity is maintained.

DESCRIPTION OF THE INVENTION

Brief Summary of the Invention

The present invention combines the immediacy and flexibility of web access to industrial controllers with the programming benefits of object-oriented design to achieve a highly integrated system amenable to ready customization and modification. In accordance with the invention, operation of an industrial controller is organized into a series of procedures. These procedures include performance of the control function as well as display of a visual representation relevant to that function (and typically including presentation of associated data). Thus, visualization of the control function is itself implemented as an object component. By accessing this component, the system designer can configure the presentation in a manner optimally suited to the control function, and modify the presentation as needs warrant or as the control function evolves.

In particular, the visual presentation may be in the form of a web page stored on the controller and accessed by a monitoring computer—typically via a web browser running as an active process on the computer—by means of the HyperText Transfer Protocol (http). The data presented on the web page may originate with other object components, rendering the data readily accessible and freeing the programmer from the need to develop data-gathering routines specifically for the presentation component. For example, the web page, configured as an object component, may be programmed to obtain the appropriate state and/or diagnostic data from other object components when the web page is accessed via a browser. The web page transmits this data along with rendering instructions that determine the manner in which the data is presented on the browser.

Alternatively, instead of transmitting data valid only at the time the web page is served by the controller, the web page may contain instructions executable on the browser that cause the browser to periodically query the controller for data. Each execution of the query routine results in transmission of fresh data to the browser, which updates the display accordingly.

The dynamic display may respond to viewer actions taken via the browser. For example, the display may allow the viewer to modify particular visual attributes, thereby enabling creation of a customized display tailored to the viewer's interests or concerns. The viewer requests a configuration property sheet containing various parameters affecting operation of the display. The display instructions may cause the remote computer to save the final display configuration (or an indicator thereof) on non-volatile storage within the viewer's computer, so that the viewer is presented with the customized display—rather than a default display—the next time he accesses the web page.

The web page may also accept input from the viewer, allowing him to directly affect control operations in real-time. Moreover, the web page may provide authorized users with access to the object components, thereby facilitating remote programming.

Accordingly, in a representative implementation, the invention comprises a controller capable of interacting with a remotely located computer, the controller having an object-oriented control structure and facilitating remote access to data formatted in accordance with instructions defined by the controller. The control structure is preferably organized around a database of object items each associated with a control function. For each control function, the items include one or more procedures for performing an action associated with the control function, and one or more procedures for displaying data associated with the control function. The action procedures effectively define the controller's repertoire with respect to a particular control function. The display procedures comprise instructions retrievable and executable by the remotely located computer, causing display thereon of the data in a predetermined format (i.e., the format prescribed by the instructions). The controller facilitates selection and performance of actions in the database, and execution of the display procedure makes the display instructions accessible to the remotely located computer.

As used herein, the term "remotely located computer" typically refers to a computer operating in a location distant from that of the controller, but may instead refer to a computer physically proximate to the controller but computationally distinct therefrom and connected thereto by means of a computer network (e.g., an intranet implementing TCP/IP) or via a data bus (e.g., across a backplane).

BRIEF DESCRIPTION OF THE DRAWINGS

The foregoing discussion will be understood more readily from the following detailed description of the invention, when taken in conjunction with the acompanying drawings, in which.

DETAILED DESCRIPTION OF THE PREFERRED EMBODIMENTS

1. Web Interface

Figure 1:
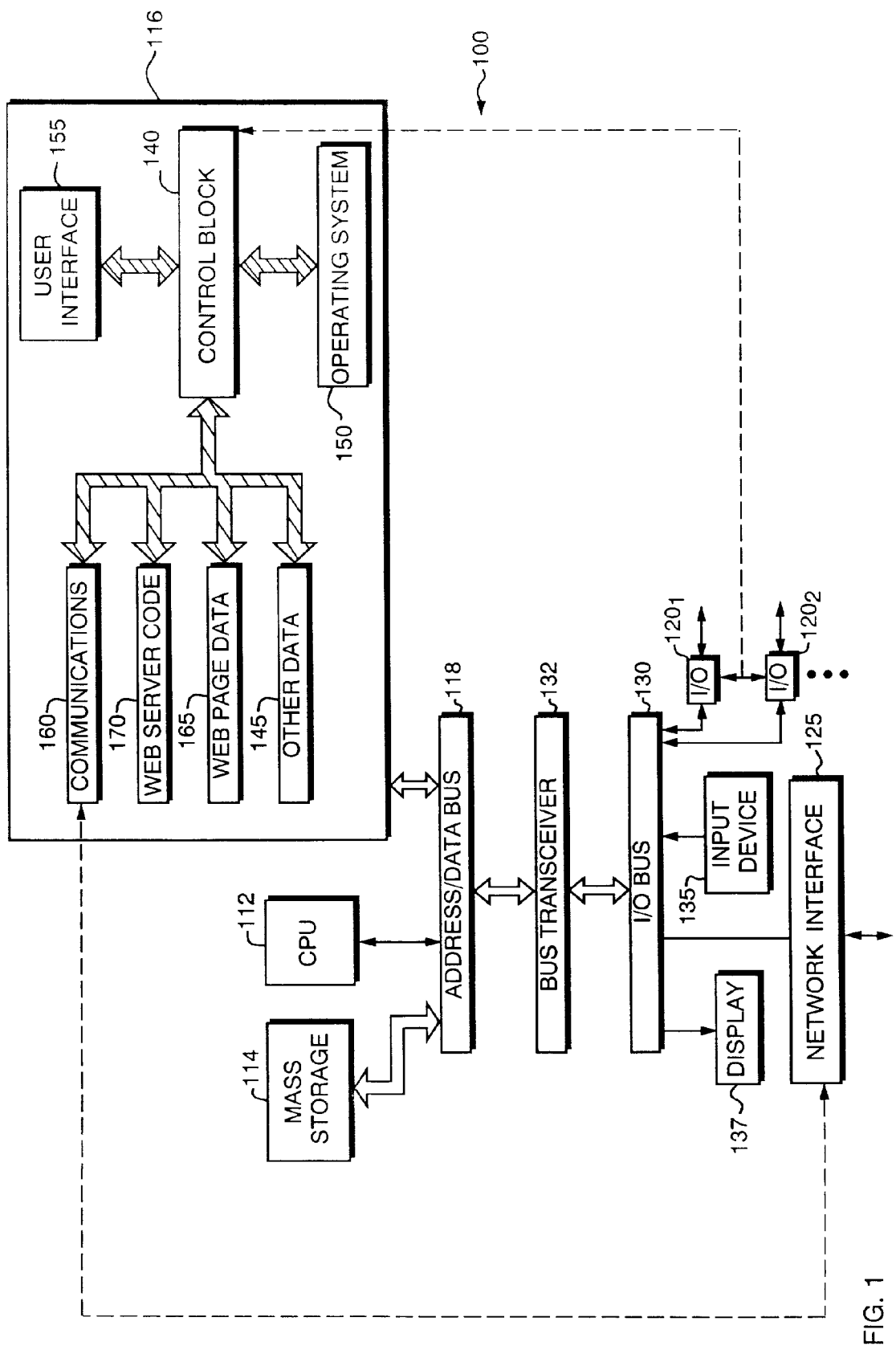
FIG. 1 schematically depicts a controller in accordance with the present invention.

The Internet, which can provide the communication medium of the present invention, is a worldwide "network of networks" that links millions of computers through tens of thousands of separate (but intercommunicating) networks. Via the Internet, users can access tremendous amounts of stored information and establish communication linkages to other Internet-based computers.

Much of the Internet is based on the client-server model of information exchange. This computer architecture, developed specifically to accommodate the "distributed computing" environment that characterizes the Internet and its component networks, contemplates a server (sometimes called the host)—typically a powerful computer or cluster of computers that behaves as a single computer—that services the requests of a large number of smaller computers, or clients, which connect to it. The client computers usually communicate with a single server at any one time, although they can communicate with one another via the server or can use the server to reach other servers. A server is typically a large mainframe or minicomputer cluster, while the clients may be simple personal computers. Servers providing Internet access to multiple subscriber clients are referred to as "gateways"; more generally, a gateway is a computer system that connects two computer networks.

In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols. The web represents one of these. Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)—can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one document to many other documents using "hypertext" links. A link appears unobtrusively as an underlined portion of text in a document; when the viewer of this document moves his cursor over the underlined text and clicks, the link—which is otherwise invisible to the viewer—is executed and the linked document retrieved. That document need not be located on the same server as the original document.

Hypertext and searching functionality on the web is typically implemented on the client machine via web browser. With the client connected as an Internet node, the browser utilizes URLs—provided either by the viewer or a link—to locate, fetch and display the specified documents. "Display" in this sense can range from simple pictorial and textual rendering to real-time playing of audio and/or video segments or alarms, mechanical indications, printing, or storage of data for subsequent display. The browser passes the URL to a protocol handler on the associated server, which then retrieves the information and sends it to the browser for display; the browser causes the received information to be cached (usually on a hard disk) on the client machine. The web page itself contains information specifying the specific Internet transfer routine necessary to retrieve the document from the server on which it is resident. Thus, clients at various locations can view web pages by downloading replicas of the web pages, via browsers, from servers on which these web pages are stored. Browsers also allow viewers to download and store the displayed data locally on the client machine.

Web pages may be written in HyperText Markup Language, or HTML, which breaks the document into syntactic portions (such as headings, paragraphs, lists, etc.) that specify layout and contents. An HTML file can contain elements such as text, graphics, tables and buttons, each identified by a "tag." Used alone, markup languages produce static web pages. Accordingly, a web page may contain programming that permits dynamic display of information. Such programming may, for example, take the form of Java instructions. Java-encoded "applets" are stand-alone programs embedded within web pages that can interact with the viewer locally, display moving animations and perform other functions on "Java-capable" browsers—that is, browsers which include a Java interpreter. The applet is transferred to the browser along with other web-page information and is executed by the Java interpreter; the data acted upon by the applet can be located on the same or a different web page, or a different server entirely, since applets can themselves cause the browser to retrieve information via hypertext links.

ActiveX controls represent an alternative to Java. These programs can be written in many computer languages (including Java) and usually compile to machine code, in which case they operate only in conjunction with browsers running on machines with appropriate processor architectures. Some languages, however, will compile to machine-independent byte codes, which can run on a variety of processor architectures. Other alternatives include DHTML and scripting. As used herein, the term "applet" refers generically to browser-executable instructions transmitted by the controller, preferably with (or adjunct to) a web page.

Suppose, for example, that a client user instructs the client-resident browser to obtain a document having the URL http://host/file.html. The browser contacts the HTTP server running on "host," and requests the document file-.html. The server finds this document and sends it according to the proper Internet protocol, along with a Multipurpose Internet Mail Extension or "MIME" identifier that specifies the document's type. When the client receives the document, the browser examines the MIME to determine whether it is capable of autonomously displaying the document, or whether an external resource (e.g., a specialized viewer to display video segments) is necessary. In a simple case, the document might contain text and graphics specified in HTML, and specify an image residing in a different file on a different server or on the same server. The browser renders the document in accordance with the HTML instructions and requests the image, displaying it in the document as specified by the instructions when the image arrives. In more complex cases the document may contain, for example, Java instructions, which are passed to the browser's Java interpreter.

Key to the concept of a web page, therefore, is the division of functionality between the client-based browser and the server-based web page, and the particular roles assigned to each. The browser locates, fetches and displays resources, executes hyperlinks and applets, and generally interprets web-page information; the web page contains data, hyperlink addresses, transfer protocols and computer instructions defining "potential functionality" that may be executed by the browser. Ordinarily, web pages reside on servers accessible via the Internet. However, the above-discussed mode of splitting functions between web pages and browsers can be instituted on internal networks as well. These networks, sometimes called "intranets," support the TCP/IP communication protocol and typically serve the needs of a single business (or business department), which may be located at a single site (with individual clients connected by a simple local-area network) or multiple physically dispersed sites requiring a wide-area network but not access to the Internet. Various of the computers forming the intranet network can be utilized as servers for web pages, each with its own URL and offering access to network client computers via TCP/IP.

2. Controller Architecture

Refer first to FIG. 1, which illustrates generally a hardware architecture for a system embodying the invention. A representative control system, indicated generally at 100, executes program instructions to operate, for example, a piece of industrial equipment. The system 100 includes a central processing unit ("CPU") 112 and one or more computer storage devices indicated generally at 114, 116. Ordinarily, storage device 114 provides nonvolatile mass storage, and may be, for example, an EEPROM, Flash ROM, hard disk or CD-ROM drive; and storage 116 comprises a combination of volatile random-access memory ("RAM") for temporary storage and processing, and non-volatile, programmable read-only memory ("PROM") that contains permanent aspects of the system's operating instructions.

CPU 112 and computer storage 114, 116 communicate over an internal system bus 118. The system 100 further includes a series of input/output (I/O) modules shown representatively at $120_1$, $120_2$ that sense the condition of, and send control signals to, the controlled machine over a machine interface (indicated by arrows). This machine interface, which may involve direct wiring or include a communication link for interaction over a computer network or telephone lines, facilitates the bidirectional exchange of signals between each I/O module and an associated device (e.g., a sensor or an actuator). I/O modules 120, as well as a network interface 125 that connects the controller 100 to a computer network, connect to a secondary I/O bus 130, which is driven by a bus transceiver 132; in effect, buses 118, 130 and bus transceiver 132 form a single logical bus.

For simplicity, system 100 is illustrated at a sufficient level of generality to encompass implementations combining both programming and control capabilities, as well as less elaborate controllers whose programming is generated on an external computer and loaded into the controller 100 (e.g., through insertion of a nonvolatile storage medium, over a computer network or serial line, over the Internet, etc.) Thus, the system 100 also comprises one or more input devices 135, also connected to I/O bus 130, that permit the operator to program the controller and/or enter information. The output of either device can be used to designate information or select particular areas of a screen display 137. In implementations providing complete programming capability, input devices 135 may include a keyboard and a position-sensing device such as a mouse, or both. In implementations providing only control functions, a less extensive input/display system-such as an operator touch screen serving as both input and display device-may be preferred.

Storage 116 contains a series of functional blocks or modules that implement the functions performed by system 100 through operation of CPU 112. A control block 140 contains computer-executable instructions for actually operating controlled equipment via I/O modules 120, and a database organization implementing the object-oriented approach of the present invention. The contents of control block 140 are discussed in greater detail below. For now, it suffices to note that control block 140 contains both the specific high-level instructions for operating the system 100 and the compiler (or interpreter) module for translating these into instructions processed by CPU 112; its operative relationship to I/O modules 120 is indicated by the dashed line. Control block 140 also interacts with a data partition 145, which includes memory cells or blocks serving as registers (for storing particular quantitive values) and flags (to indicate binary status information).

Storage 116 may also include an operating system 150, which directs the execution of low-level, basic system functions such as memory allocation, file management and operation of storage device 114; and instructions defining a user interface 155, which facilitates straightforward interaction over screen display 137. User interface 155 generates words or graphical images on display 137 to represent a simulation, prompt action by the operator, and accept operator commands from input device 135.

A network communication block 160 provides programming to operate local-area network hardware and/or to connect with a remote network or network host. In the latter case, communication module 160 drives a modem within network interface 125 or other data-transmission circuitry to transfer streams of digitally encoded data over telephone or other communication lines.

Storage 116 also contains data structures defining one or more web pages stored as objects or object data as described below, and shown representatively at 165. The web pages 165 include controller data obtained from one or more of I/O modules 120, HTML formatting instructions and associated data, and/or applet instructions that cause a properly equipped remote computer to present a dynamic display. For example, an applet might cause temperature data to be displayed as a graphical representation of a thermometer, with the height of the rendered mercury column dynamically varying in proportion to the data from I/O modules 120 (and constantly provided to the remote computer via network interface 125); pressure data might be represented in the form of a graphically rendered needle-type pressure gauge. Such renderings and the integration of data therein are straightforwardly implemented by those skilled in the art (and familiar, for example, with the Java language) without undue experimentation. Management and transmission of web pages 165 to a querying computer is handled by a web server module 170, which allows controller 100 to function as a network server. Once again, the features of this module are conventional in the art.

Incoming data from I/O modules 120 may be processed by control block 140 before being copied into one of the web pages 165. Because of the linking capabilities of the web, it is not necessary for the data to be stored in the web page containing the display instructions; instead, the latter page may contain a "hyperlink" pointer to a different web page in which data is accumulated. In addition, a web page can obtain data from other servers (e.g., from different controllers) by querying those servers across the network (using TCP/IP or another protocol) when appropriate. For example, if a cluster of controllers is operationally related such that data from one is usefully combined with data from the others, each page of the cluster can contain instructions to access the other pages (or their associated data pages) when accessed by a viewer, and the applet configured to present data from the entire cluster. Alternatively, the applet can be configured to cause the client's browser to access the web page. As used herein, data is "associated with" a web page or an applet if it is stored as part of the web page or applet, or stored in a directly or indirectly hyperlinked web page.

Figure 2:
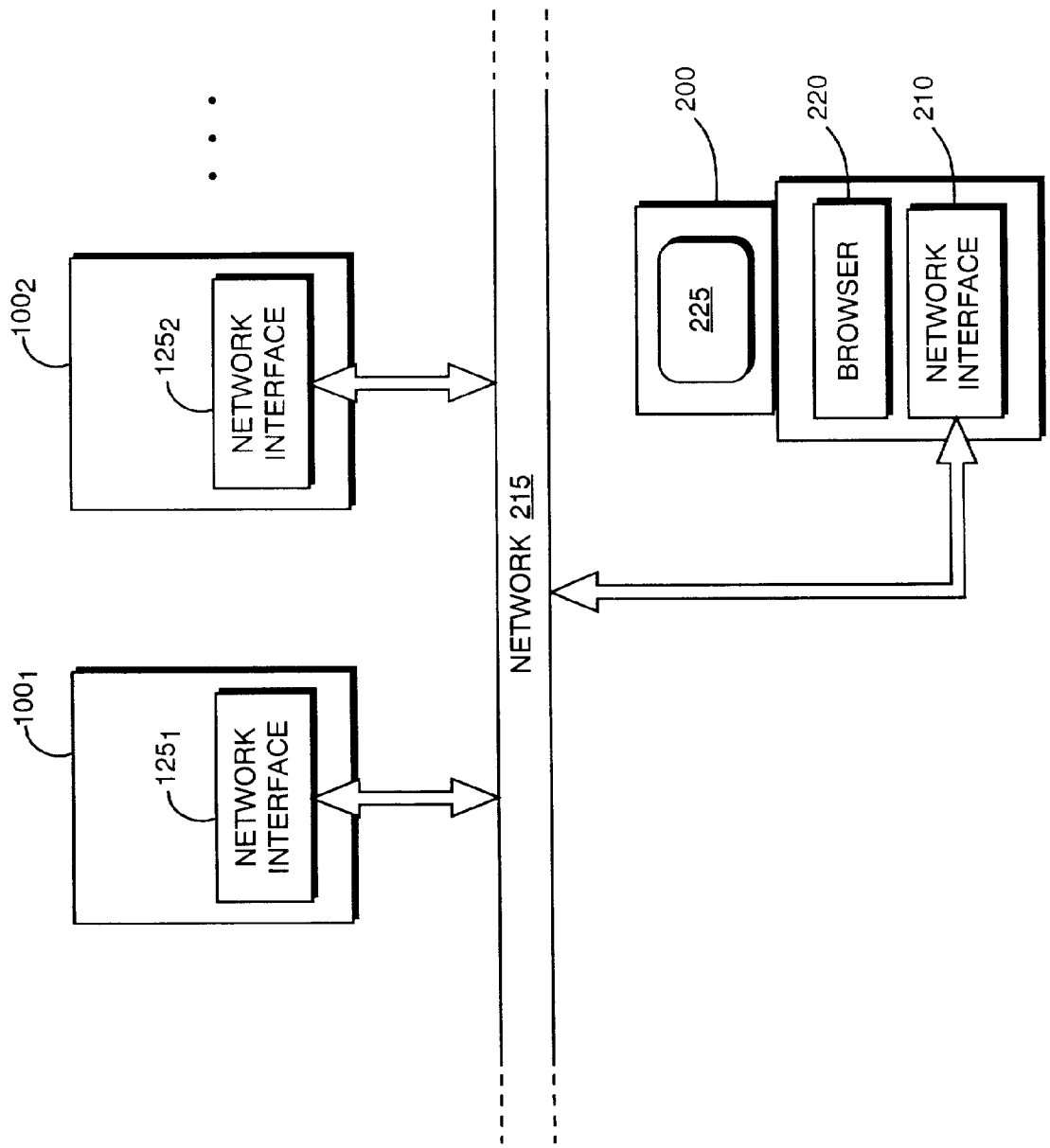
FIG. 2 schematically depicts a system incorporating multiple controllers as shown in FIG. 1 and a browser-equipped computer capable of accessing data associated therewith.

Refer now to FIG. 2, which illustrates the manner in which multiple versions of the controller 100 are linked and queried by one or more monitoring computers. The querying computer 200, which functions as a network client, may be, for example, a personal computer running the Windows graphical user interface supplied by Microsoft Corp. Computer 200 includes a network interface 210, which facilitates connection to and data transfer through a computer network 215 (which may, again, be a local network, the Internet, or an Internet-linked local network). The communications relevant to the present invention are handled by a web browser 220, which resides within computer 200 and operates the computer's display (e.g., video or liquid crystal) 225. Naturally, computer 200 also contains various conventional components, i.e., system storage, an operating system and a graphical user interface, and a keyboard and/or position-sensing device (e.g., a mouse) for accepting input from the user. For convenience of presentation, these are not shown.

Browser 220 contains functionality for locating and fetching, via network 215, web items (e.g., static pages or pages containing dynamic applets) identified by a URL, displaying these, executing applets, executing hyperlinks contained in web pages and selected by the viewer or invoked in an executing applet, and generally interpreting web-page information. The web items ordinarily are contained in the web pages of one or more controllers $100_1$, $100_2$, etc. As explained earlier, the web pages contain markup data, hyperlink addresses, transfer protocols and computer instructions defining applets. Browser 220 may be any of the numerous available web browsers, e.g., NETSCAPE NAVIGATOR (supplied by Netscape Communications Corp.) or INTERNET EXPLORER (supplied by Microsoft Corp.).

In a working system, the network interface $125_1$, $125_2$, etc. of every controller in the system is constantly active and in communication with network 215, facilitating access by computer 200 to any controller-based web page(s) at any time. In this way, computer 200 can examine the data associated with any controller merely by specifying the appropriate URL of the controller's primary web page. The web page (and, preferably, an applet associated therewith) is copied to browser 220 and displayed along with the relevant, timely data. For example, the applet, executing on client computer 200, can autonomously access data from a web page different from the primary page the client viewer originally specified, all in a manner completely invisible to the viewer. Such access can be periodic or essentially continuous for data subject to rapid change.

Naturally, the network accessibility of control data, particularly over the Internet, raises security issues. It may be desirable to equip controller-based web pages with a password access feature, whereby browser 220 or an executing applet must present a password before being accorded access to associated data. In addition, the data may be encrypted before being placed on the network. These functions are handled by communication module 160, which acts as a gatekeeper to web server module 170. Security-clearance functions are conventional and readily implemented by those skilled in the art.

Security becomes particularly important if the controller-based web pages allow client computer 200 not only to access data, but to modify it as well. For example, while "read-only" access to control data suffices to inform the client user of the state of a controlled machine or process, the user cannot, if limited to such access, influence the operation of the controller. It may prove desirable, therefore, to allow an appropriately authorized client to directly modify control parameters (which may, for example, be stored on a restricted-access web page) or otherwise direct the operation of the controller and, hence, the controlled machine or process. Indeed, a controller-based applet invoked by the viewer's interaction with one of the controller's web pages can permit the remotely situated client user to operate the controller hardware-for example, causing the controller to execute a reset routine that restarts automated equipment following shutdown, or causing the controller to operate in a step-by-step fashion for diagnostic purposes.

3. Objects and Object Components

The operations of controller 100, including web pages, are encapsulated as object procedures and data. Objects can be defined in various ways. In a prototyping implementation, objects are either created in their entireties or selected from pre-programmed object-template libraries. For example, if objects corresponding to different robot-arm devices contain much the same information (i.e., the information common to all robot arms is substantial), the library of available object templates contains a "robot arm" prototype that the programmer selects, customizing its attributes to suit the particular device the object is intended to represent.

Alternatively, the system of the present invention can support the property of inheritance, whereby properties or attributes of hierarchically superior objects are automatically inherited by hierarchically subordinate objects. This is accomplished by organizing the objects into hierarchical classes within the database, each class representing the template for a set of similar (in the sense of sharing structure and behavior) objects. Thus, objects in a subclass automatically acquire the object items (e.g., the frames and methods) associated with superior objects. To add a new machine of a particular class to an equipment assemblage, for example, the programmer creates an instance of the class, which automatically inherits all of the object items associated the that class, and then adds programming specific to the particular machine. Consequently, if the machine is a new robot arm added to an assembly line, the new object will already contain procedures for extension and retraction; the programmer then adds routines governing the operation of this particular arm and its relationship to other machines in the assembly line.

Hierarchical relationships among objects are not limited to inheritance and class. In addition, objects can be related to one another based on a hierarchical ranking, with higher-tier "parent" objects having pointers to lower-tier "children" objects. As a result, higher-tier objects may behave as if they "contain" hierarchically related, lower-tier objects for purposes of operation or system organization.

Objects can also delegate tasks to one another. For example, an object may not contain programming to perform a particular method, but instead hold a pointer to another object's method appropriate to the requested task.

Actions are performed on an object, or the entities represented by an object caused to perform an action, by invoking one or more of the encapsulated methods of the object that determine its behavior. A high-level routine requests an object to perform one of its methods by "sending a message" to the object, in effect telling the object what to do. Messages therefore perform a task similar to that of function or procedure calls, and can contain arguments that are acted upon by the method. The receiving object responds to the message by choosing the method that implements the message, executing this method and then returning control to the high-level routine, along with the results of the method.

Again, returning to the robot-arm example, a program step requiring actuation of the arm might, in a procedural language, be represented as a series of instructions turning on a solenoid valve and monitoring the progress of arm extension. In accordance with the present invention, the robot-arm object is told to perform its "extend_arm" method; the procedural logic required to execute the action is already associated with the object, so the object effectively "knows" how to extend the arm.

Accordingly, the control functions performed by a controller in accordance with the invention are each organized into one or more procedures for performing particular machine actions. The progress of an action, or some parameter of the action-taking machine (which may or may not be associated with an action), is represented by one or more "states." An object manager associates entries corresponding to the items of an object (including the action(s) and the state(s)), and contains storage locations where the associated procedural instructions and/or data are to be found. The action can be independent of state information, or can instead be executed in a manner responsive to a sensed state.

Beyond actions and states, objects can also contain items including (i) a list of the "resources" of the object, i.e., the various I/O points, registers, flags, etc. by means of which actions are effected and states determined; (ii) diagnostic procedures and/or templates (which may be associated with actions or remain separately callable) that evaluate performance of the action against pre-determined criteria and take specified actions if performance deviates from an acceptable range; (iii) metrics, dynamically updated as the object executes (that is, as the controlled machine runs), which maintain historical and statistical data concerning machine performance; and (iv) procedures for displaying information associated with the control functions, the procedures determining the manner in which a remote viewer interacts with the controller and the data it generates.

A diagnostic template, for example, may provide multiple, specified, discrete time spans each reflecting a different machine condition, each condition specifying an action associated therewith. If the controlled machine processes a workpiece, early confirmation of action completion may indicate that the machine is not loading properly, while excessive times to completion may signal a jam. Alternatively or in addition, the template may accommodate a range of possible input values (e.g., a control signal whose magnitude indicates the level of a continuously variable parameter such as tank pressure), specifying a different action associated with different input levels. These condition-indicating variables are herein referred to as "limit parameters."

The actions specified in the template entries might include, for example, issuing an alarm, adding the input value or time to a list for contemporaneous or subsequent review by the system operator, updating a display, branching to a failure-recovery sequence, or continuing the present state or process; the absence of an action (e.g., if the input value or time falls within the normal working range specified in the template) allows the controller simply to proceed with program execution. Each template entry, representing a different machine condition (e.g., normal operation and varying degrees of deviation), may be associated with a different action or with no action at all.

More generally, in accordance with the object-oriented approach of the present invention, actions are invoked as tasks initially processed by the object manager, which actually locates the object-bound actions. Typically, a message designates a particular action of an object rather than the object itself. The messages originate either with the high-level control program, which governs operation of a particular machine or set of machines by appropriate messages; or with the executing method of another object.

For example, a series of objects might each control a different component of a single machine. The high-level program dictates overall machine operation, invoking object procedures as necessary for proper control of the different machine components. Alternatively, the overall machine may be only one of several such machines on a factory floor, each machine being represented by an object (and the machine components by objects hierarchically subordinate to the machine objects), with the high-level control program orchestrating operation of the entire assemblage of machines. In this case, procedures of the machine-component objects are called by the machine objects, while procedures of the machine objects are called by the high-level control program.

Encapsulating the characteristics, capabilities and functionality of a controlled machine as an object (in the form of actions, states, resources, diagnostics and metrics) provides the programmer with access to information not accessible in more traditional programming representations, as well as reducing the complexity of the programming task by "packaging" standard components of functionality. Consistent with these objectives, the actual programming implementation of the invention can take several forms. On the one hand, the objects can be used simply as programming aids that exist only at programming time, disappearing at compile time: that is, a compiler (or interpreter) translates the high-level program, the called actions, and other object components that directly participate in controller operation into executable machine code. At the other extreme, the objects retain their complete existence as the program executes. For example, the high-level code might be compiled, but action calls are processed by the object manager and retrieved from the object data structure at run time; in other words, the object items do not become incorporated into a static stream executable code, but are remain as table data accessed as the program executes. In the preferred approach, object items are, in fact, compiled at least partly into executable code, but also remain accessible to the programmer for inspection or alteration. By requiring, for example, run-time lookup of state parameters, diagnostics and metrics, the programmer retains the ability to modify controller behavior by making appropriate changes to the object items (and without directly altering executable code).

Figure 3:
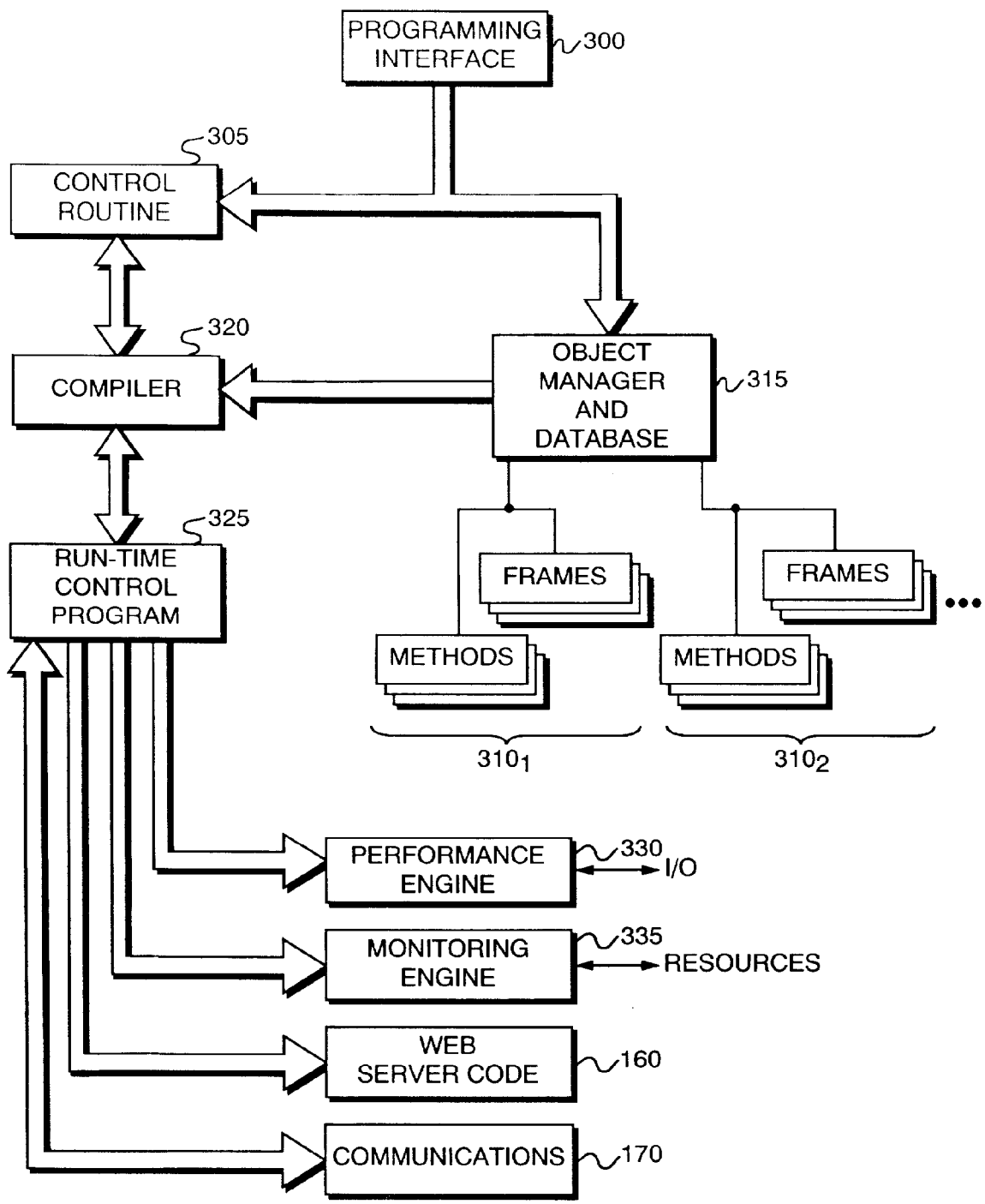
FIG. 3 schematically illustrates the object-management features of the present invention in greater detail.

FIG. 3 illustrates the organization of control block 140 in greater detail. Again for purposes of simplicity, the more elaborate type of system offering both programming and controller functionality is illustrated. A programming interface 300, which communicates with the programmer via user interface 155, allows the programmer to enter instructions (including invocations of object actions) that collectively forms the high-level routine 305 governing control and display of data; and to define object items and enter data and/or programming functionality into these. In particular, programming interface 300 provides the programmer with the object views described below; information entered by the programmer is organized into a series of objects representatively indicated $310_1$, $310_2$ by an object manager and database 315.

Each object 310 comprises one or more actions—e.g., an action associated with a control function or with a display function—and a series of frames characterizing the object. An "action" may be a step or series of steps performed on the controlled machine (connected to controller 100 by means of I/O modules 120), and represented by a series of executable instructions defining the action. The steps may directly execute a control function, or may instead bear on that function only indirectly; for example, one action might implement the control function, and another implement a recovery routine should the control function fail.

An action may also be a procedure for causing display of controller data on a remote computer. The procedure may, for example, assemble a web page or specific components thereof from a library of templates in accordance with specifications provided by the program designer. The web page is transmitted to the remote viewer's browser upon the viewer's selection of the page. In some embodiments, the web page itself (or more typically, an applet running thereon) may permit the viewer of the display to alter its contents locally. The viewer's alterations to the display may be stored locally on the remote computer (and, if the computer has multiple users, associated with the viewer's identifier) so that the viewer is presented with the modified display rather than the default display the next time it is accessed. In other embodiments, an authorized user may be accorded access to the web-page object itself, or even the entire controller object.

Object manager 315 maintains organizational control over the objects themselves, which are generally stored in a database format, associating the various frames and methods of each object with the object name by means of pointers (thereby encapsulating the frames of an object within the associated methods, as described above). This form of organization allows both frames and methods to be specified (programmed) once but used repeatedly, since different objects can contain pointers to the same method, while nonetheless retaining integrity as independent objects. If the implementation of the invention supports heritability, object database 315 enforces this property as well.

As will become clear, because of the availability of encapsulated procedures, the high-level control instructions of the present invention are not only less lengthy than those of traditional programmable controllers, but more general as well; the programmer is freed from repeating the low-level commands that define specific control operations and display appearance (since these are stored in the objects), and need only specify the desired operations themselves. In other words, the programmer need only invoke objects, rather than reproducing the methods they include. Moreover, the methods can be self-operative in the sense of reacting to observed conditions without explicitly being invoked by the programmer.

The control routine 305 is translated into machine-executable instructions by a compiler 320, resulting in a run-time control program 325 (which may be stored in memory 116 or, more typically, in nonvolatile storage 114). As stated earlier, the preferred instructional paradigm for control routine 305 is a state-control language that represents controller actions in terms of steps, each of which consists of a command that creates action and one or more instructions for leaving the step. Interpreters and compilers for this and other types of controller languages are well characterized in the art. See, e.g., U.S. Pat. Nos. 5,321,829 and 5,287,548 (the entire disclosures of which are hereby incorporated by reference) and the QUICKSTEP™ User Guide published by Control Technology Corporation, Hopkinton, Mass.

In one embodiment, compiler 320 accepts not only the control routine 305, but also the various object items specified in the control routine and necessary to its operation. These items are obtained via object manager 315 and compiled along with control routine 305 into run-time program 325. For example, the final run-time program 325 may explicitly contain the executable instructions comprising the actions and state definitions contained in all objects 310 relevant to the control routine 305.

In the preferred embodiment, however, at least some (and possibly all) of the object items are not compiled, i.e., remain as table data accessed by run-time control program 325 in the course of its execution. In this case, the instructions of program 325, as well as the actions and other object items they specify, are read in rapid sequence and executed by CPU 112. The instructions cause system 100 to examine the condition of selected sensing devices associated with controlled equipment, and, based thereon, to send appropriate operative control signals to the equipment via I/O modules 120.

A performance engine 330 implements the control actions specified by the run-time control program 325 through manipulation of the controlled machine at I/O points accessed through I/O modules 120. A monitoring engine 335 receives or accesses data relevant to the action under execution. The data can originate in the controlled machine itself (and be received via an I/O module 120) or within the controller 100, or some combination thereof. For example, the progress of the action may be monitored through a first control point; the temperature of the controlled machine (which must remain within an operating range in order to continue performance of the action) may be monitored through a second control point; the time to completion of the action may be maintained by the controller itself and stored in an internal register; and an internal flag may indicate the completion of a prior, predicate action. These I/O and internal sources of data, which may be queried by monitoring engine 335, are referred to as "resources." Monitoring engine 335 is configured to establish, via I/O modules 120, the control connections necessary to access the listed resources. It should be stressed that, depending on the application, monitoring engine 335 may be a separate module (as illustrated) or may instead be implementing by appropriate monitoring instructions within object methods (or may even be executed by a separate CPU); the principle of operation, however, remains unchanged.

The role of monitoring engine 335 is ordinarily to provide action-related information—that is, data representing the measurable characteristics of an action, or other relevant characteristics associated with the controlled machine—to performance engine 330, which utilizes this in the course of execution; and to display object components provided or accessible to a querying remote computer via web server code 170 and communications module 160. Typically this means acquiring data relevant to a state specified in one of the frames defining the object. Monitoring engine 335 may simply enter the data into the "State" frame of the object, which is read (in the preferred embodiment, which involves run-time lookup of object items) by performance engine 330 and display object components during the course of execution.

Alternatively, monitoring engine 335 may perform an analytical or interpretive function, using the data to further characterize the state. For example, an object may contain one or more diagnostic templates that relate various data ranges to specific conditions; in this case, monitoring engine 335 consults the template for the condition specified therein, and determines the value or state of this condition through analysis of the raw data. In either case, the monitoring engine is said to be "determining the state" specified in the frame. These examples also highlight the advantages of the preferred embodiment of the invention, where the executing program retrieves data from a structure also available (as discussed below) as a visible object to the controller's user or to a programmer. This mode of operation assists in program debugging and redesign, since controller behavior can be directly traced to conditions capable of direct examination; as well as verification of proper controller operation.

More generally, however, monitoring engine 335 maintains state information that may bear only indirectly on the method currently under execution. For example, the temperature of the controlled machine may be directly relevant to a particular action (e.g., a high temperature causing, in accordance with the action, branching to an exception-handling routine), as well as more generally relevant to operation of the machine in a global sense (e.g., a dangerously high temperature calls for termination of machine operation regardless of the current action, or later data analysis may indicate a correlation between operating temperature and defect rate). Indeed, monitoring engine 335 may acquire and maintain a more or less consistent suite of information regardless of the current action; the particular information relevant to the current action is entered into the state frame of the associated object, while other information is ignored. This information may be obtained by an applet executing on a remote querying computer via the computer network connection, and presented to the viewer in the form determined by that applet (which may be responsive to viewer modification).

Operation of the invention, as well as the nature and properties of the object frames, is best understood from the perspective of the objects themselves. FIGS. 4A–4G illustrate both the frames and methods of an exemplary object as well as an interactive window for permitting the designer to enter object-defining information and parameters. In accordance with the invention, once the designer has characterized all objects necessary for proper functioning of the controller, he is free to program controller operation in high-level code that merely invokes the objects—without replicating the lower-level procedural code residing within the objects themselves.

Figure 4A:
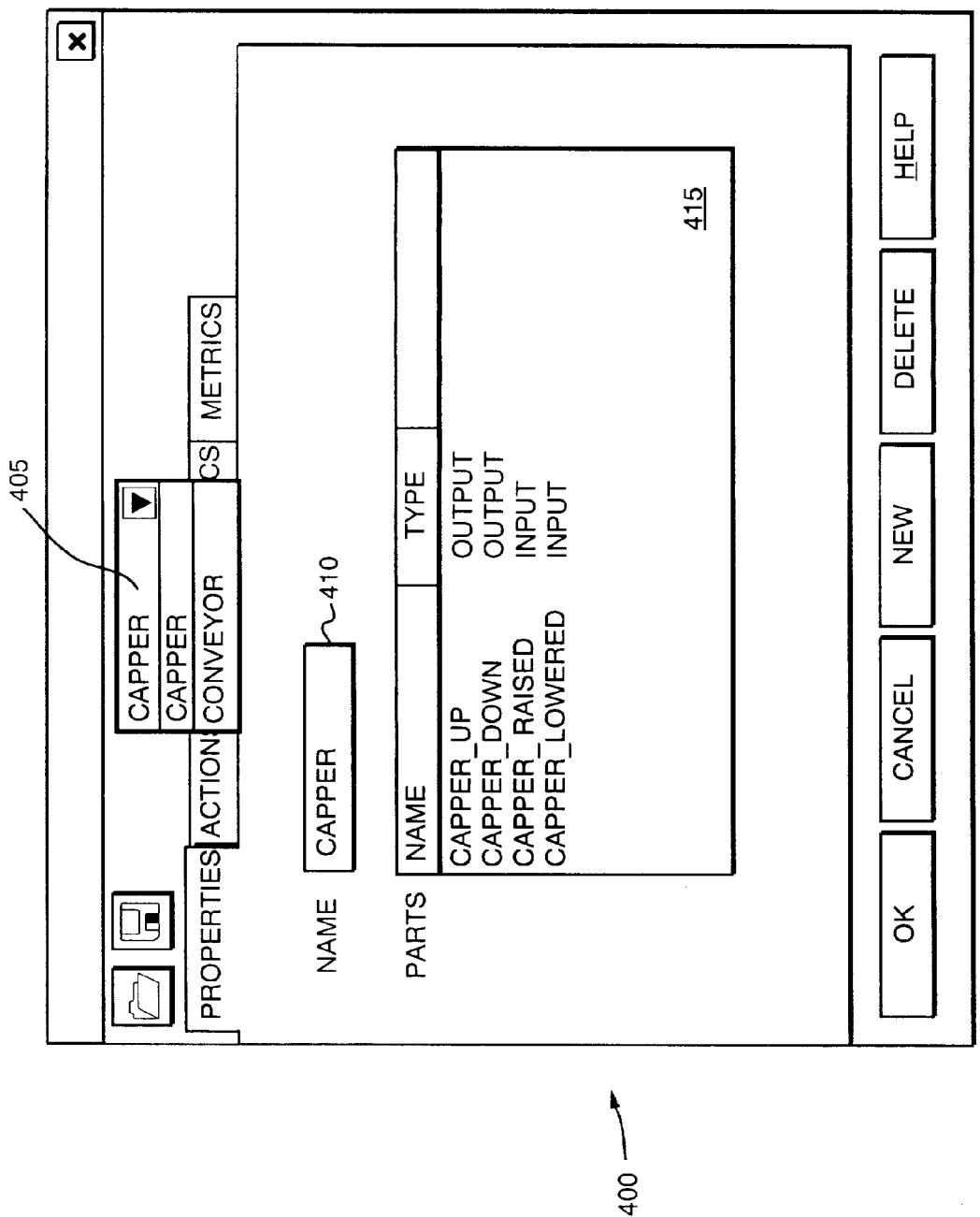
FIGS. 4A–4G graphically depict a user interface suitable for data entry into a database in accordance with the invention.

The window 400, which is generated by programming interface 300, can display any of various object components, each of which is identified by a labeled tab that the viewer may select by clicking with a mouse in accordance with conventional windows display routines. In FIG. 4A, the "Properties" tab has been selected. Boxes 405, 410—the former visible regardless of the selected tab, the latter shown only under the Properties tab—contain the name of the current object. Interface 300 allows the viewer to specify the name either by typing it into box 405 using keyboard 135 (in which case interface 300 either locates an existing object via object manager 315, or, if no existing object matches the entered name, instructs object manager 315 to create a new object), or by clicking on the down arrow associated with box 405 and selecting from the resulting pull-down list of available objects; the latter operation is illustrated in FIG. 4A, which results in two objects—Capper and Conveyer—being listed. Selection of Capper identifies this object as the current object in box 410, so that the information under each tab is specific to the Capper object. The Capper object controls the mechanism on a bottle-capping machine that actually applies caps to bottles as they pass under the mechanism.

The "Parts" field 415 lists all of the resources (inputs, outputs, registers, flags, subobjects, etc.) that are associated with the object Capper. These resources include two outputs (I/O points to which commands are issued by performance engine 330, via I/O modules 120) and two inputs (I/O points where confirmation signals are received by monitoring engine 335, once again via I/O modules 120). Generally, the resources associated with one object cannot be directly accessed by other objects, although they can be indirectly accessed by sending a command to the object Capper. (This latter capability is standard in the art; see, e.g., U.S. Pat. No. 5,202,981.) Resources and their types are entered by the designer via keyboard 135. Performance engine 330 and monitoring engine 335 may consult (via object manager 315) the Parts field of an invoked object in order to establish the necessary control connections.

Figure 4B:
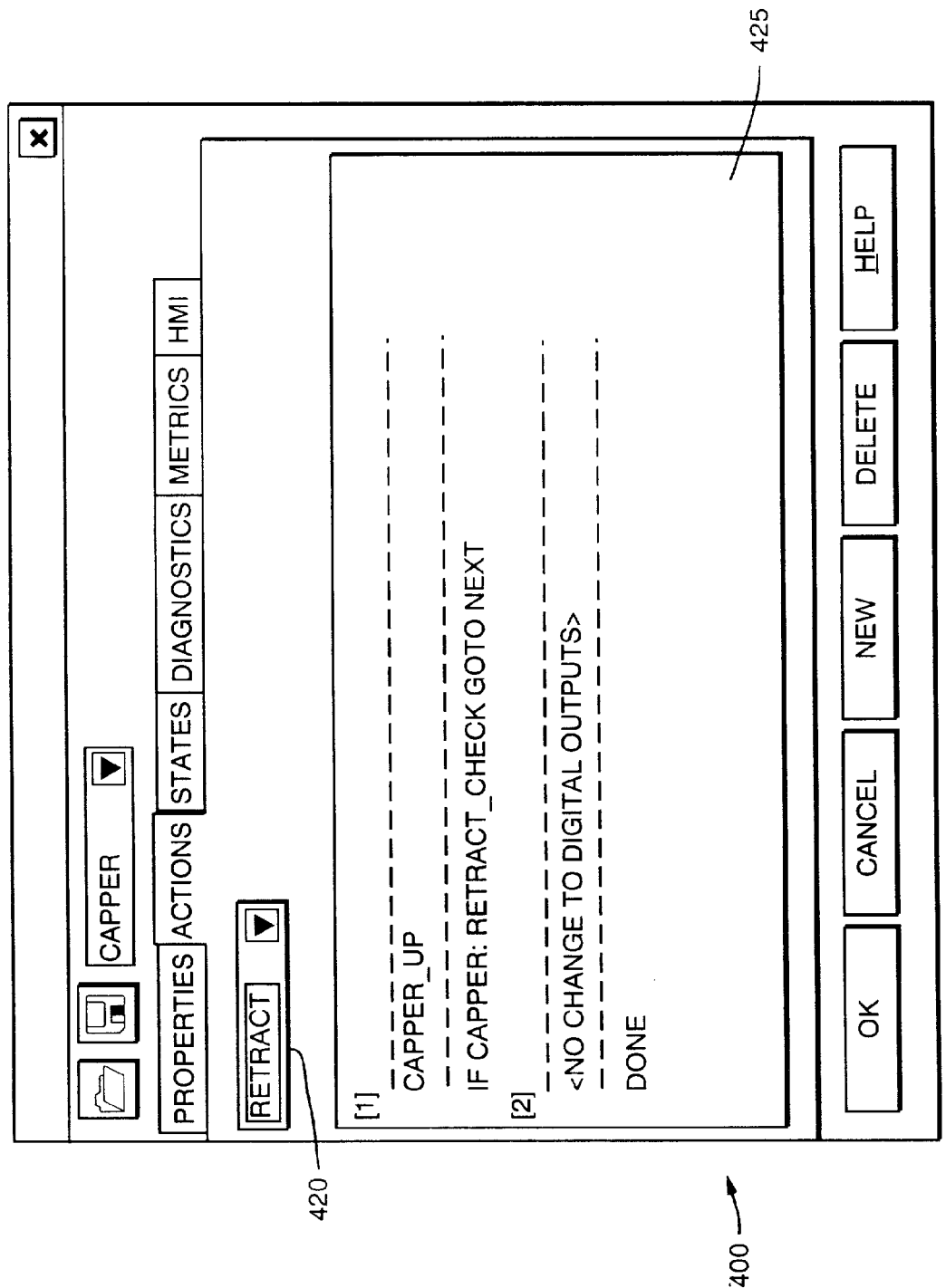

The actions (i.e., methods) associated with an object—that is, the functions (typically mechanical in nature) the object is programmed to perform—are listed under the "Actions" tab, as shown in FIG. 4B. Actions are defined or selected for editing using the name box 420. The actions are each defined by conventional procedural task steps (such as QUICKSTEP™ commands); the tasks defining the selected action—"Retract" in FIG. 4B—are displayed in the window 425. The actions are invoked by the high-level program (or by a higher-level object containing the Capper object) using a command specifying Capper:Retract, which, when sent to object manager 415, causes the object Capper to execute its action called Retract. The illustrated action contains the command CAPPER_UP, which causes a signal to be sent to the output resource CAPPER_UP (see FIG. 4A); and an instruction, Capper:Retract_Check, referring back to the same object. This instruction tests the state of the object, as discussed below.

The advantages of hierarchical object organization are readily apparent in the context of actions. For example, a hypothetical object named Gripper, designed to control a robotic gripper, might have only two actions named Open and Close. These actions are invoked by the high-level control program or by a hierarchically superior object by calling Gripper. Thus, a higher level object named Loader might control the parts-handling robot of which the robotic gripper is a component part. This object may have more elaborate actions, e.g., Load_Part and Unload_Part, that make use of the functionality embodied in Gripper—that is, the Load_Part and Unload_Part actions would likely contain a number of Gripper:Open and Gripper:Close commands.

Figure 4C:
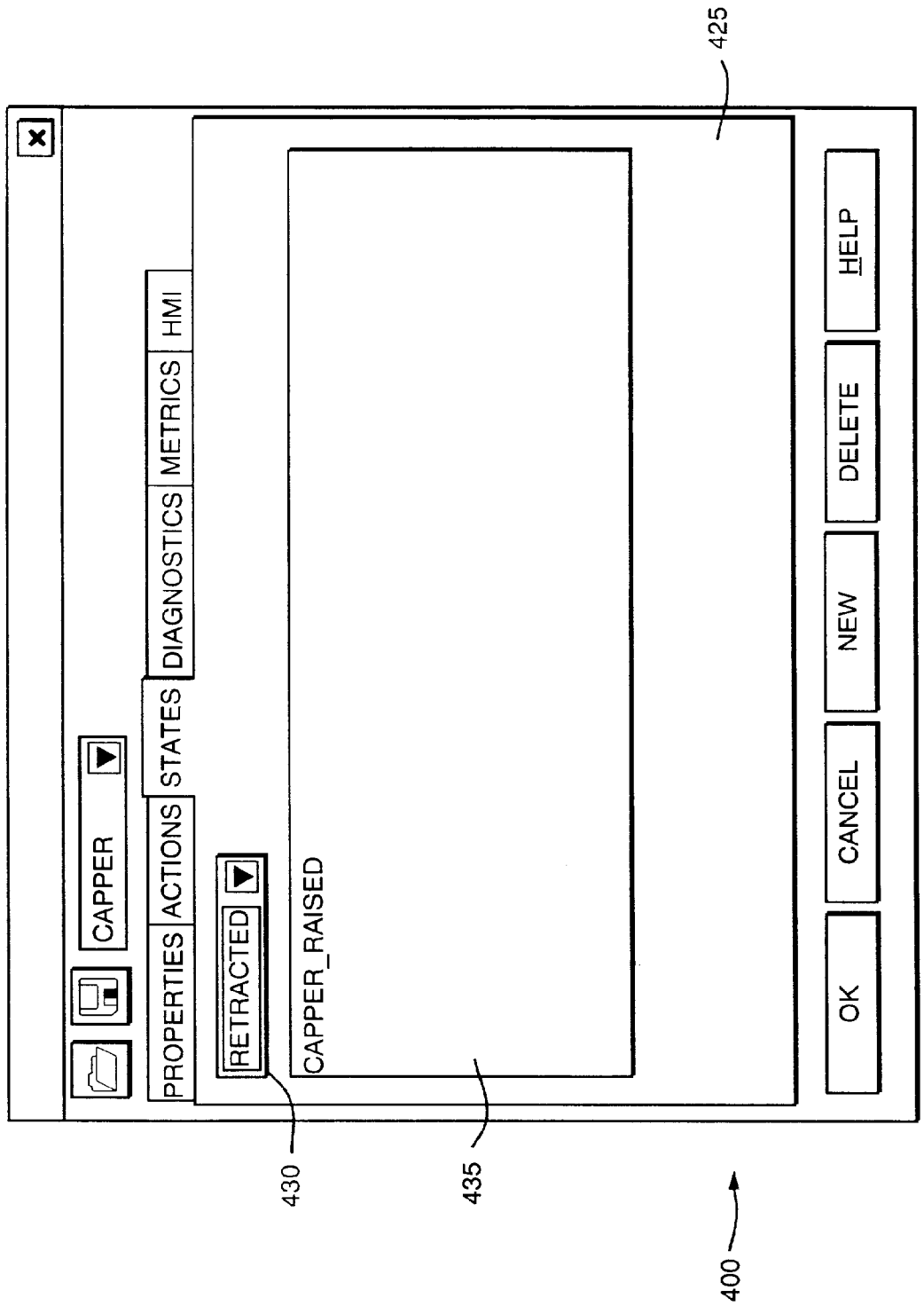

The possible states defined for an object are listed under the "States" tab, as shown in FIG. 4C, and may be tested, as just noted, by appropriate instructions issued by the actions within the object itself or by a higher-level control program. States represent test or other conditions associated with an action or with the controlled machine generally. The currently available states are listed in the pull-down menu of box 430, and the characterstics defining the selected state are shown in the window 435. The designer may define a new state by typing its name into the box 430 and defining its characteristics in window 435; object manager 315 enters these into the database containing objects 310.

The illustrated example shows a state called Retracted, associated with the object Capper. The definition of this state is a simple one: it characterizes the state of the input resource called CAPPER_RAISED (see FIG. 4A). In more complex cases, the state may reflect a combination of multiple inputs, flags, and tests. By issuing the instruction if Capper:Retracted goto next, an action tests whether the state is true—that is, whether the capping mechanism has been raised—and if so, proceeds to the next step. (That next step may reside within the current action, as shown in the figure, or elsewhere; e.g., in the high-level control program.)

This example demonstrates how organization of actions and states into objects simplifies machine reconfiguration. Suppose, for example, that an improved bottle-capping mechanism were to add a second limit switch to be tested in combination with the input resource CAPPER_RAISED in order to determine whether the mechanism were fully raised. By changing the definition of the state Retracted to include both tests, the tests would be automatically be performed at all points of the control program referring to this state.

Figure 4D:
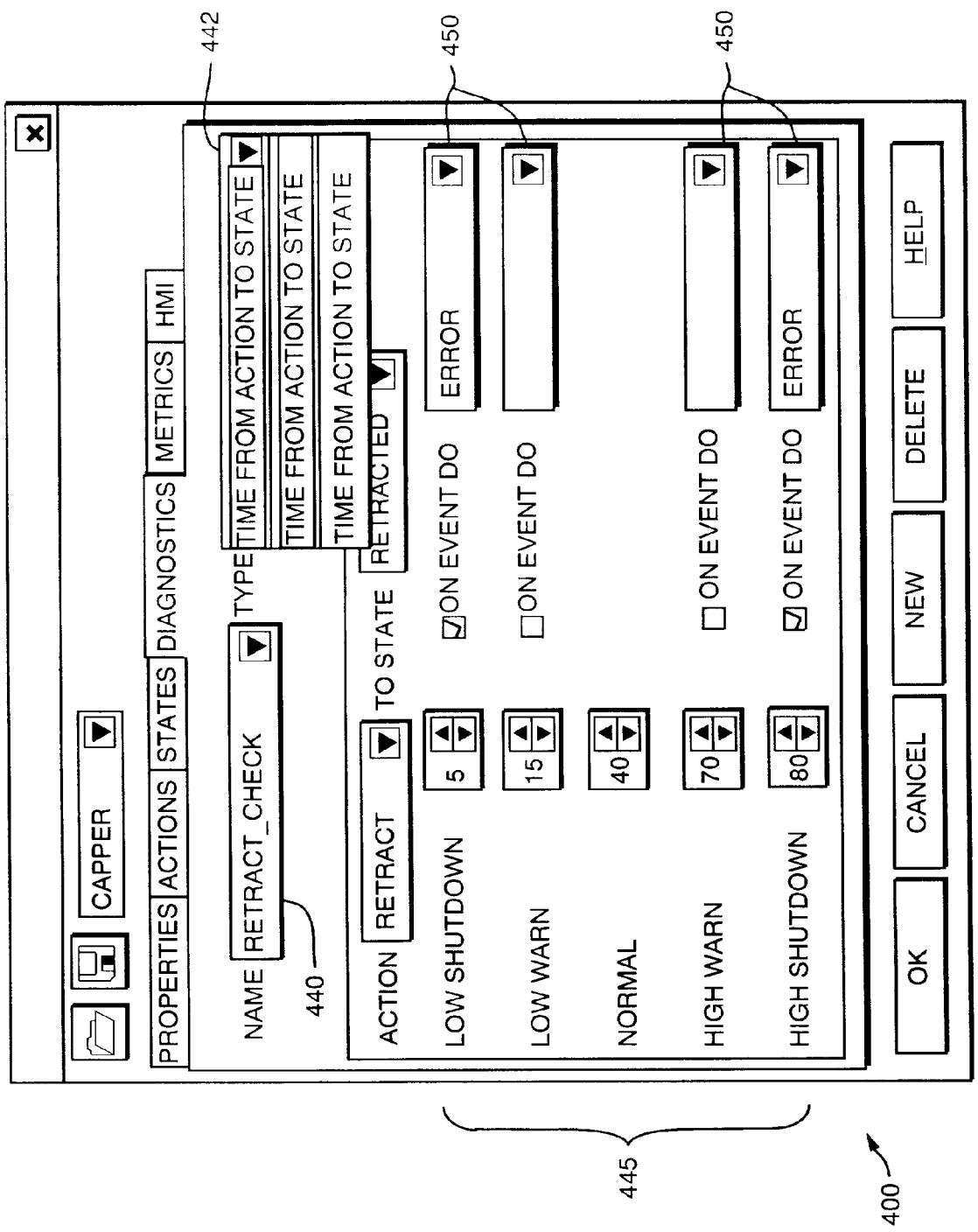

An object can also hold diagnostic information. In particular, an object may contain, for each state, a template specifying conditions and associated processes, actions or states; in this way, various modes of abnormal operation-which may be defined, for example, as deviation by a predetermined extent from a mean limit-parameter value—can be addressed in a manner appropriate to that condition. This is illustrated in FIG. 4D, which shows a diagnostic titled Retract_Check (as indicated in the name box 440); this diagnostic analyzes the time between the completion of the action named Retract to achievement of the state named Retracted. More generally, diagnostics relating to the expected timing behavior of an object measure the time between an action and some resulting state, or the time between two related states. This is specified in the Type field 442, which indicates that time is the relevant limit parameter.

The diagnostics frame contains a series of fields (i.e., attributes) relating various values or value ranges of the limit parameter to associated machine conditions, each of which may require a different form of handling—e.g., branching to a different control routine, issuing an alarm, etc. In the illustrated case, the frame contains five fields 445 corresponding to five different machine conditions: Low Shutdown, Low Warn, Normal, High Warn, and High Shutdown. A limit-parameter value (in this case, a time) is entered for each condition in the associated box, either by typing or clicking on the arrows. The significance and interpretation of these entered times depends on the existence of entries in the "On Event Do" fields corresponding to each of the condition fields 450. If an entry is added for a particular condition field, the action stated in the entry is associated with the specified condition.

The diagnostic Retract_Check is configured to register a Low Shutdown condition upon an action-to-state time of 5 msec or less; a Low Warn condition for times in excess of 5 but equal to or less than 15 msec; a normal condition for times between 15 and 70 msec; a High Warn condition for times in excess of 70 but less than 80 msec; and a High Shutdown condition for times in excess of m80 sec. (Naturally, different applications may have different numbers of condition fields.) "On Event Do" actions—i.e., branch routine names or actions to be taken—have been entered for the extreme conditions Low Shutdown and High Shutdown. Upon detection of one of these condition outside the normal range, the object causes the action specified in the On Event Do field to occur—namely, the task called ERROR, which may shut down the machine and issue a notification to the operator. On the other hand, the conditions Low Warn and High Warn may correspond to inefficient machine behaviors or projected failure states, requiring no immediate action or a warning to the operator. These conditions may serve statistical or historical functions (e.g., as performance records associated with the controlled machine), and may be received, for example, by a central station monitoring the performance of all controllers on a network.

Figure 4E:
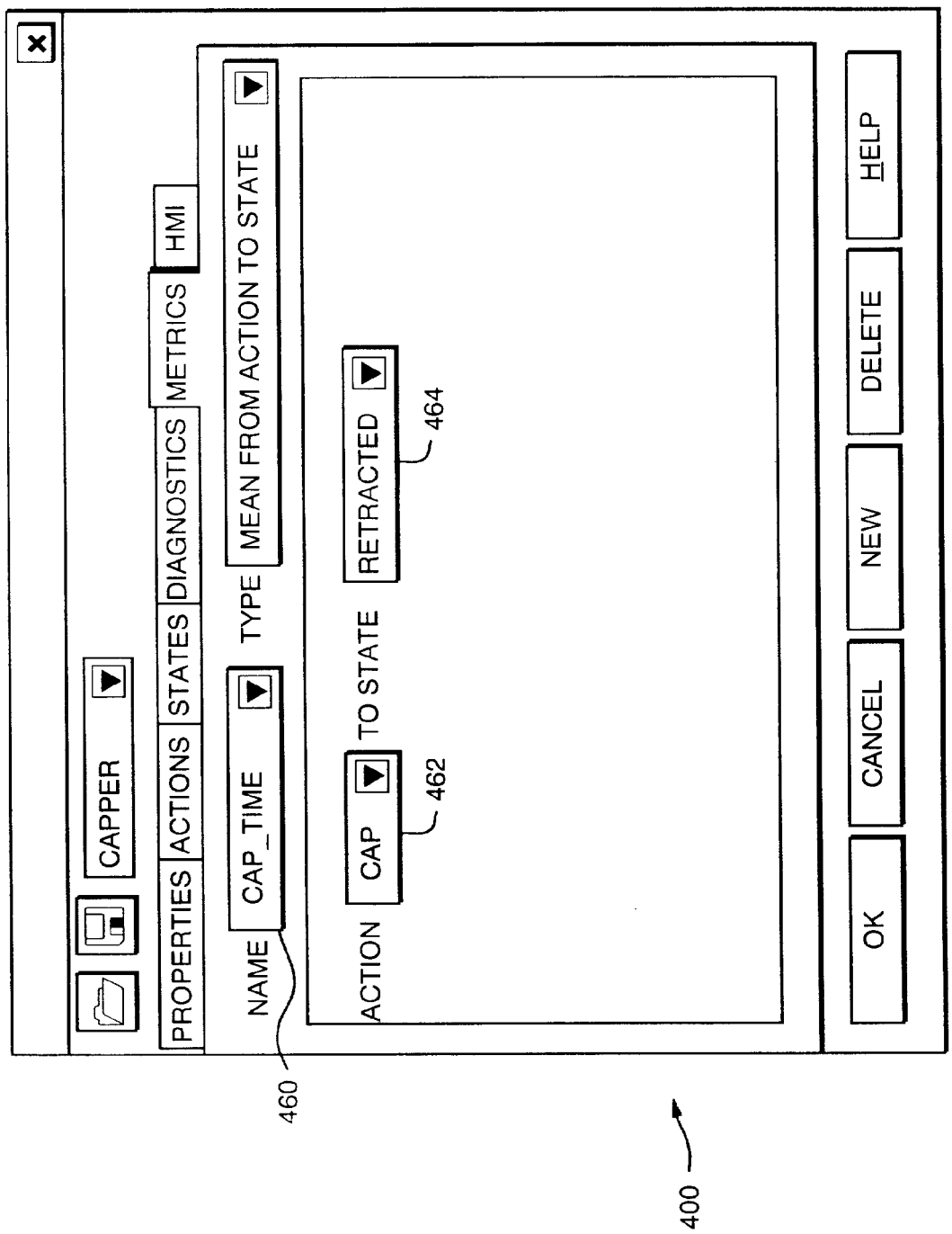

Also relevant to ongoing monitoring of machine performance is the "Metrics" frame shown in FIG. 4E. This frame facilitates accumulation and processing of data relating to control transitions—generally, the time between an action and a succeeding state. The name of the transition is entered in the name box 460, and the action and state defining the transition are entered in boxes 462 and 464, respectively. Thus, the metric named Cap_Time records each transition interval between the action Cap and the state Retracted. The "Type" field specifies an operation performed on the measured intervals, the result of which is stored in a data partition associated with the metric. In the illustrated example, the metric Cap_Time keeps running track of the mean interval time; this value remains associated with the name Cap_Time, and may be examined or utilized like any named variable. Multiple metrics can be applied to the same interval; for example, a different metric might utilize the same interval but perform thereon a different statistical operation. In addition to time-based measurements, metrics can track other quantitative performance indicators such as production or reject counts.

The Properties, States, Diagnostics, and Metrics frames all contain data representative of the objects with which they are associated. Some of these data (such as the object name) are static, while other data (such as Metrics) are dynamically updated. Still other frames (such as Diagnostics) specify operations involving monitoring of resources and the triggering of actions in response to detected conditions.

Preferably, the objects are organized such that they are invoked not by name, but by particular components. A high-level program (or hierarchically superior object) refers not to an object as a whole, but to a method or frame of the object. For example, a command to execute the Retract action of Capper would not call Capper, since this object may be encapsulated by numerous methods; but would instead specify the method Capper:Retract, typically by means of a "do" instruction (e.g., do (Capper:Retract) goto next). States may be invoked within an action (as shown above) or in the high-level control program to test conditions predicate to branching or proceeding; for example, states may be tested as part of an "if" statement—if the state is true, the next action is taken (e.g., if Capper:Retracted goto Conveyor).

Diagnostics may be explicitly invoked as tests predicate to proceeding, as shown in FIG. 4B (if Capper:Retract_ Check goto next), or may instead be self-operative merely as a consequence of object presence or invocation of any object action. In the latter case, the instructions defining the diagnostic are executed on an ongoing basis by monitoring engine 335. Similarly, metrics may be executed upon command, or automatically—either by direct implementation by monitoring engine 335 (again, as a consequence of object presence or action invocation) or by code automatically inserted into a program that invokes a particular action.

Figure 4F:
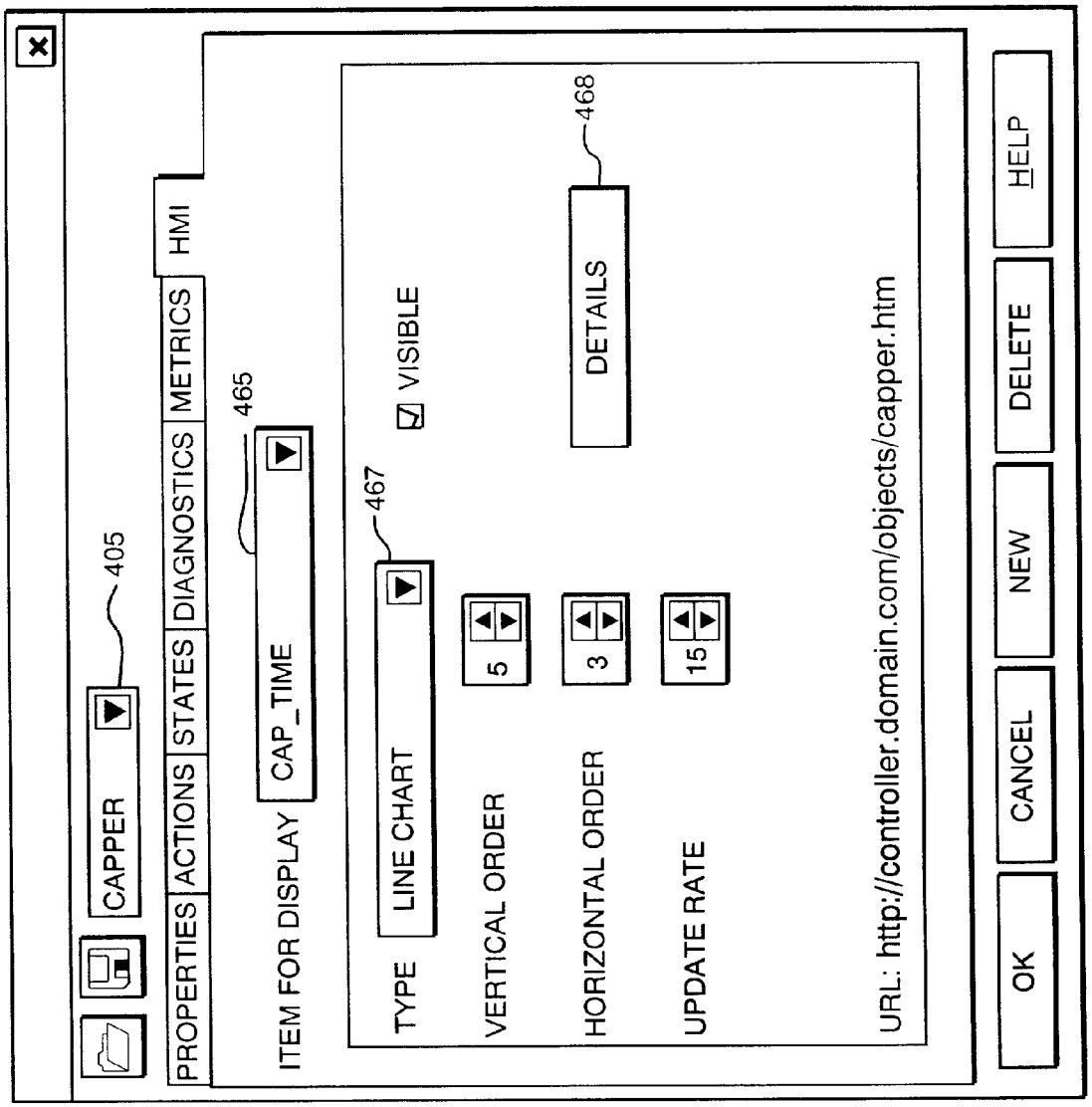

FIG. 4F illustrates a "human-machine interface" (HMI) object component that determines the manner in which controller data is presented on a computer connected to the controller by means of a network. For purposes of the present discussion, it is assumed that the controller 100 is equipped with a web interface as illustrated in FIG. 1, and that the remote viewer connects to the controller via the web.

The object components available under the "HMI" tab permit the designer to determine the items displayed on the web page associated with the object Capper, and the manner of that display. The displayed items may include one or more properties, actions, states, diagnostics, and metrics as described above, or other object-based information relevant to the control function or machine performance (e.g., the time from an action to a state or the time from a first state to a second state). The frame shown in FIG. 4F is a simple embodiment in which the designer selects one or more display items using the item box 465. In the illustrated example, the parameter to be displayed is Cap_Time, i.e., the total time for the capping operation involving extension and retraction of the capping mechanism (corresponding to the time from the action "Cap" to the state "Retracted"). The URL address for the web page is http:// controller:domain.com/objects/capper.htm. The check-box labeled "Visible" allows the designer to suppress display of some defined control items; for example, a particular object class may include a predefined suite of displayed items, not all of which are appropriate for every use of the object. Selection of the "Details" button causes an additional window to appear, allowing modification of other display attributes (e.g., the foreground and background colors, alarm colors or attributes, etc.).

The designer may select among different forms of display by interacting with the type box 467. Each display format supported by the object is listed as an available option in box 467, and the programming code that creates the browser-executable display instructions is encapsulated as an object method that utilizes the designer's entered parameters. In the illustrated example, the designer has selected a line chart with a vertical order of 5 and a horizontal order of 3. A web page may contain multiple displayed items, and the vertical and horizontal orders determine the position of the visual representation of the line chart in the web page. Thus, a single, generic web-page creation method can be used in a plurality of objects. The run-time control program 325 executes the "line chart" web-page method based on the defined parameters and choices in the HMI frame. The method embeds the location of the information to be displayed (in the present case, the action-to-state time interval Cap_Time, which may also be contained in the Diagnostics object frame), and generates web-page rendering instructions based on the horizontal and vertical order. These web-page instructions become associated with the object and do not change until modified by the designer (or, possibly, by the viewer as discussed below). For example, the web-page creation method may assume a generic form of web page that the designer can modify by changing the web-page rendering instructions.

In a static embodiment, the web-page code associated with the object Capper is sent only once to the viewer in response to his selection of the page via his browser. That is, a line chart is constructed based on historical information spanning a predetermined time range and ending with the most recent value of Cap_Time, and positioned on the previously defined web page as specified by the designer. Run-time control program 325 transmits the web-page rendering instructions to the viewer's browser via web-server code 170 and communications module 160.

Preferably, however, the web page presented to the viewer is not static, but rather is capable of autonomous action while executing on the viewer's browser. This is typically accomplished by embedding applet code in the web page. In the embodiment illustrated in FIG. 4F, the web page is capable of updating the line chart on the viewer's display every 15 sec. When the web page is rendered on the viewer's browser, applet code causes the browser to communicate with the controller every 15 sec to obtain new Cap_Time data. The applet then modifies the displayed web page to incorporate the newly retrieved data into the illustrated line chart.

For example, in one embodiment, an applet queries the controller over the web by messages sent via a "connectionless" IP protocol such as UDP (i.e., the user datagram protocol). Encapsulated in each message is the Internet address of the remote computer on which the applet is running. The controller extracts this address and responds to the contents of the request by obtaining the specified register values. These are then sent back to the applet by means of the same IP protocol.

Figure 4G:
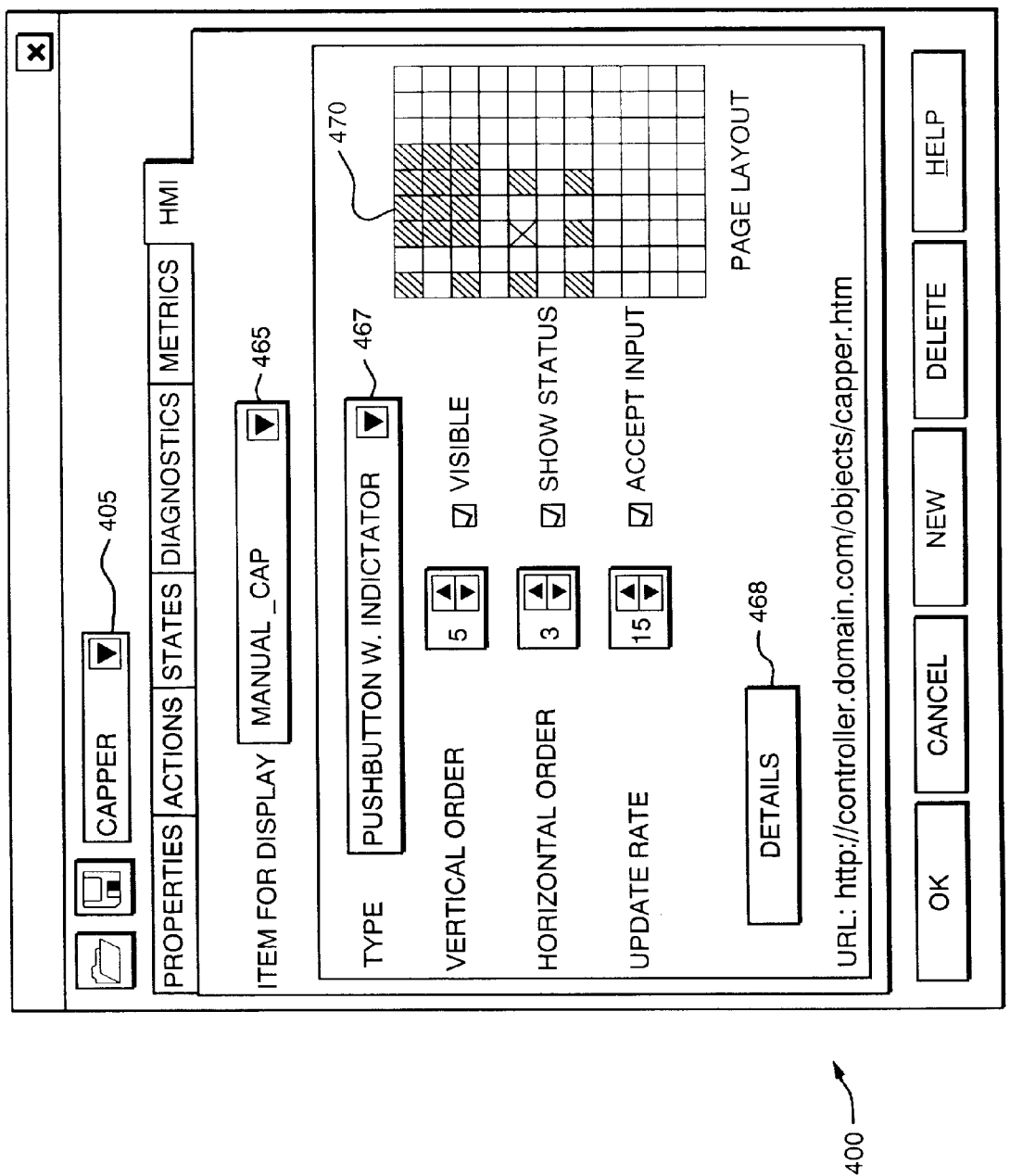

An alternative HMI frame for the object Capper appears in FIG. 4G. In this case, the item displayed is Manual_Cap (rather than Cap_Time), referring to a manual capping operation that the viewer may effect via the displayed web page. The web-page display includes a manual pushbutton switch (which may or may not be representative of an actual pushbutton switch mounted on the control panel of the capping machine). The position on the web page of the rendered pushbutton switch is once again specified by the vertical and horizontal order. In this case, however, a visual indication of that position is given by a grid 470, on which the 5,3 position of the Manual_Cap control is highlighted by an "X." The designer may select the rendered position of the item Manual_Cap using the vertical and horizontal order boxes, or by clicking on one of the squares of grid 470; similarly, the item may be moved by changing the vertical and horizontal order values or by clicking and dragging the designated grid square. The shaded areas of grid 470 illustrate unavailable regions (based on the design elements of the web page or due to the presence of previously defined control items).

The "Accept input" check-box enables the displayed pushbutton switch to behave as a real switch, accepting input from the viewer and transmitting this to run-time control program 325 on the controller. In this way, the viewer is permitted to actually operate the controller via the display; for example, the viewer may click on the graphical pushbutton depiction to remotely activate the functionality associated with it, causing the controller to operate the capping machinery (perhaps overriding a manual pushbutton switch on the machine's control panel). The "Show status" check-box causes the pushbutton facility to graphically depict the state of the functionality associated therewith, i.e., not only to cause the controller to respond to the viewer's command but also to visually display the results (e.g., by changing form from an unpressed button to a depressed button).

Figure 5A:
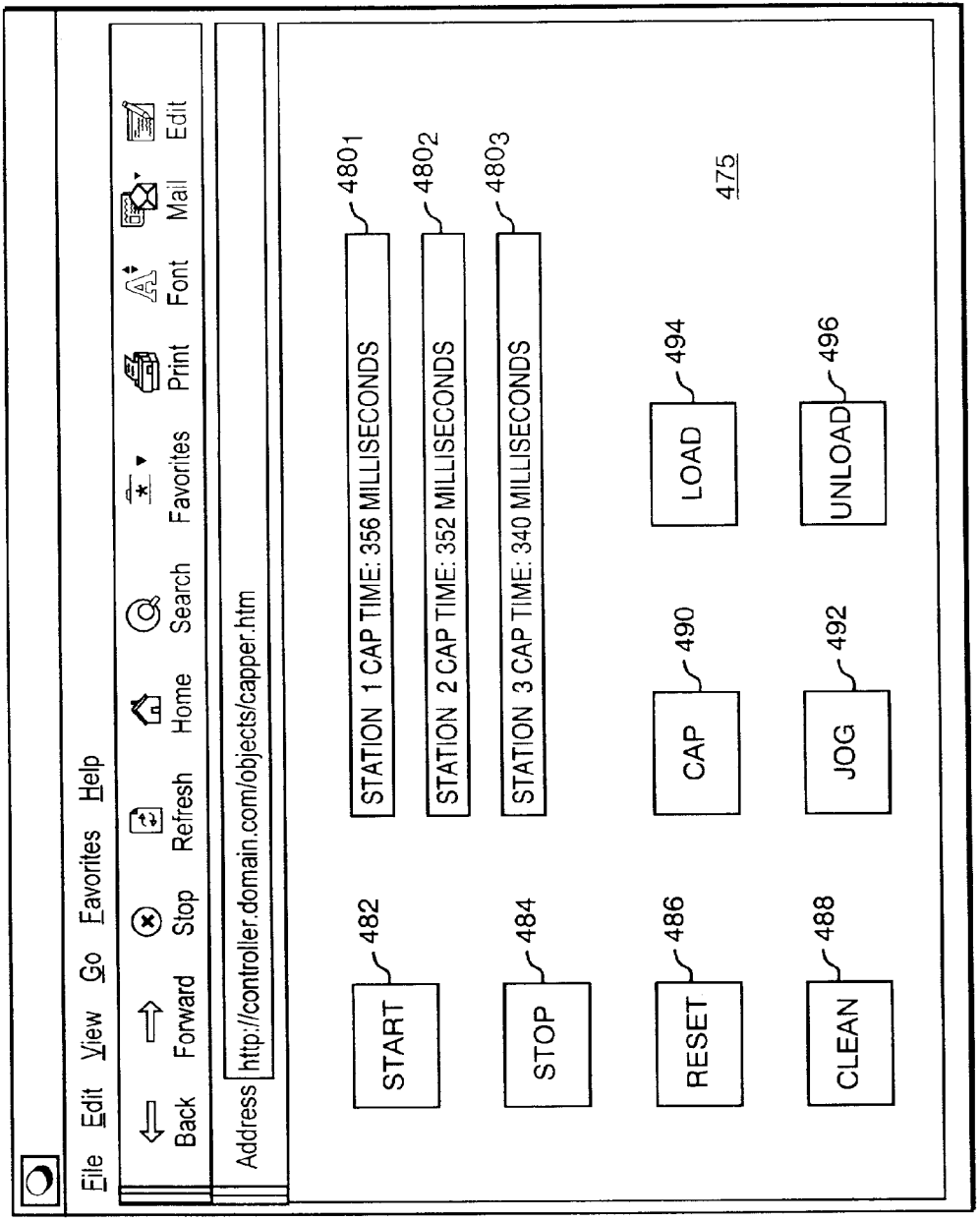
FIGS. 5A–5C show representative remote displays generated in accordance with the invention.
Figure 5B:
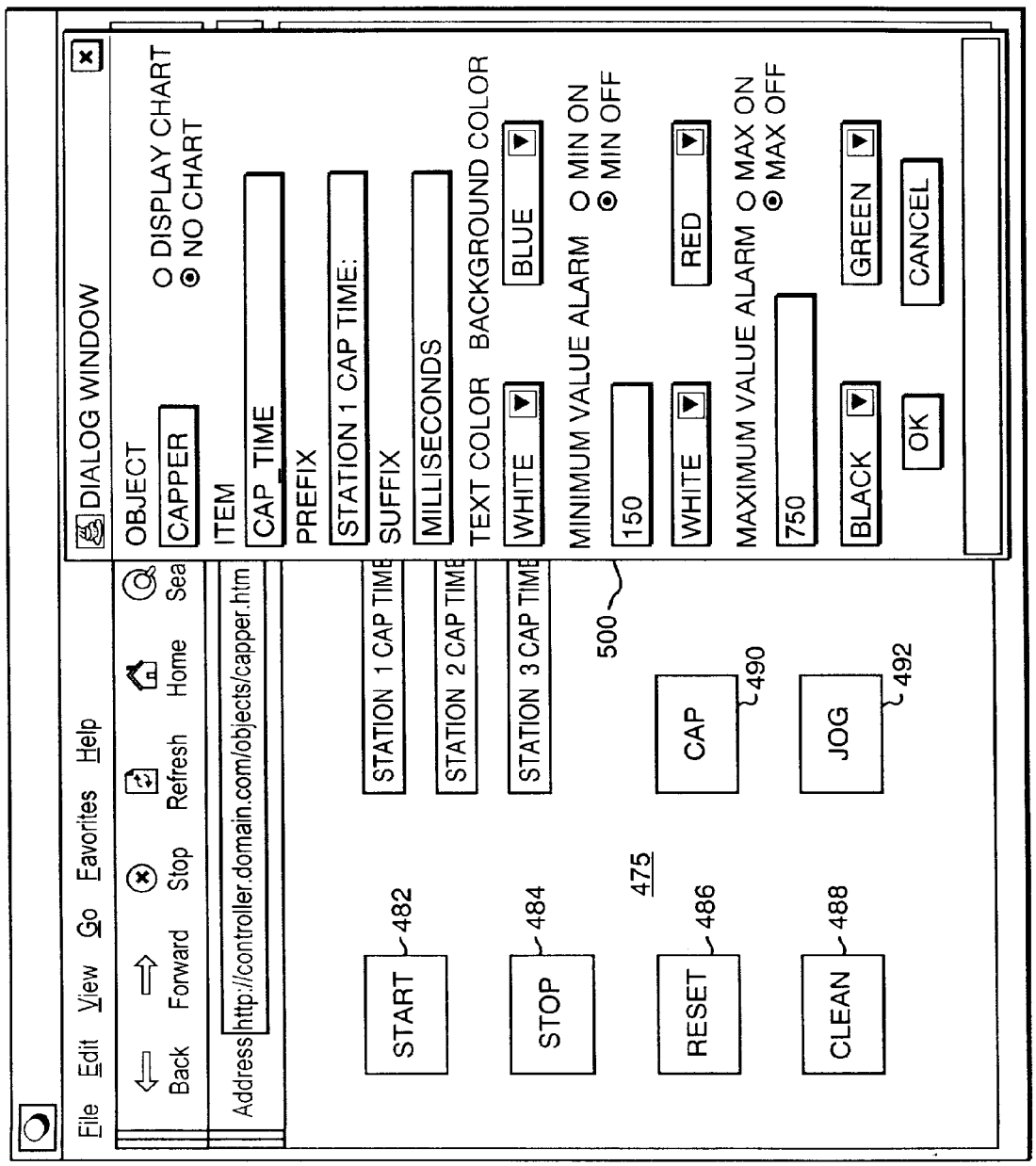
Figure 5C:
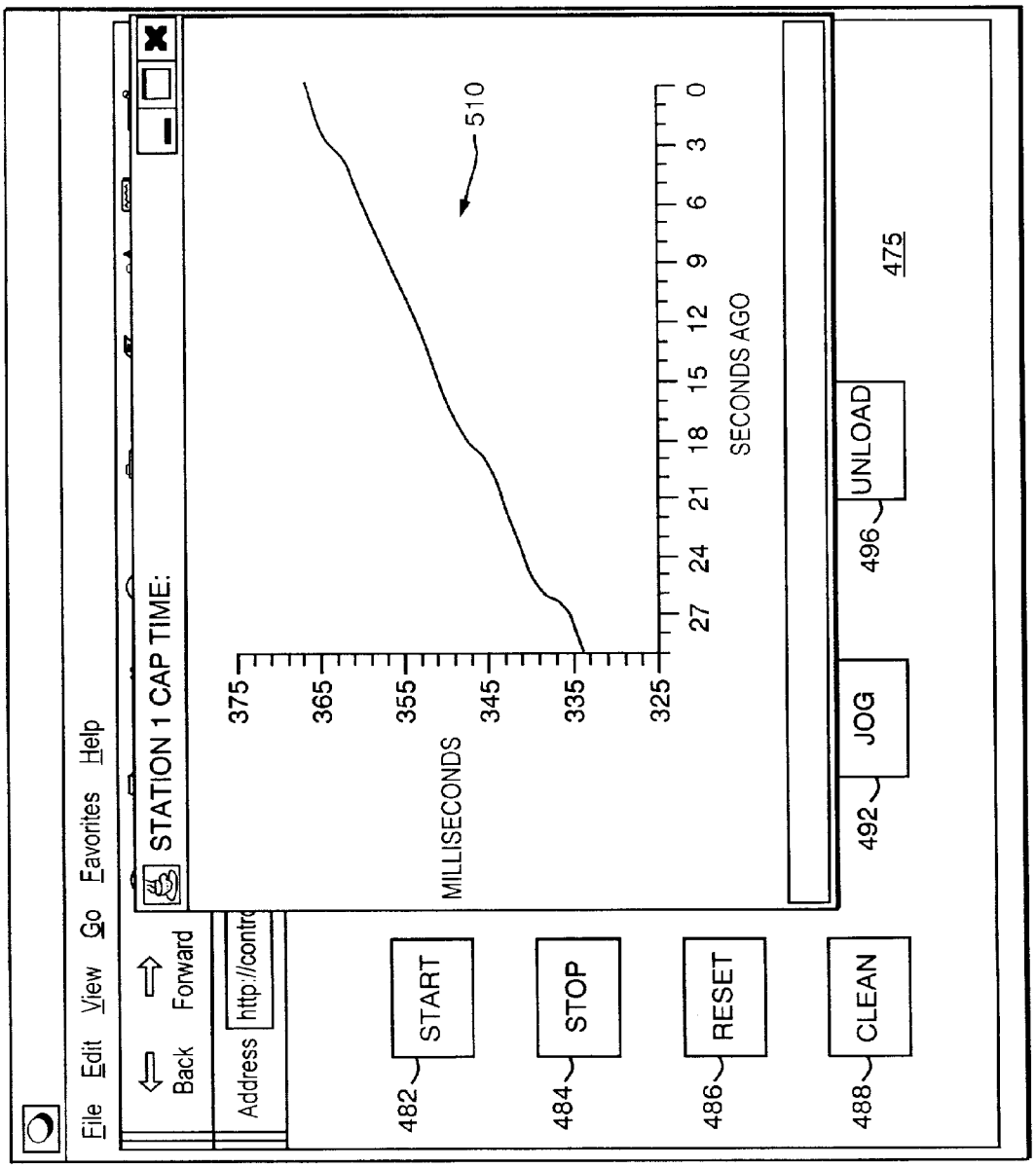

Refer now to FIGS. 5A–5C, which illustrate the manner in which a series of controllers may simultaneously represented on a single display of a remote computer by means of applets. The illustrated web page 475 shows a group of displays $480_1$–$480_3$ each generated by one of three corresponding applets, the applets themselves being generated by a controller supervising three bottle cappers associated with a single controlled station. Each applet display indicates the action-to-state interval Cap_Time, described above, exhibited by one of the cappers operated by the controller generating the applet. When executing on the browser of the viewer's computer, the applets periodically query the controller at preset intervals (e.g., every second) to update the displayed information.

Although the illustrated case involves multiple applets generated by and interacting with a single controller, this need not be the case. More generally, simultaneously displayed applets can be generated by different controllers in different locations or at a single location, remote or local to the computer hosting the applets. In other words, the system can be configured such that by calling a single web page, the viewer is delivered data generated by different devices (e.g., by embedding pointers within each of the controllers to the others, and causing a selected controller to establish TCP/IP connections with the others; or by causing the web browser to establish such multiple connections).

Web page 475 also contains an illustrative series of manual pushbuttons 482–496, each corresponding to a different controller operation that the viewer may actuate remotely by mouse-clicking the appropriate button. Each pushbutton 482–496 is generated by a separate applet, which communicates with the controller as described above. Depending on how the applets and the controller are programmed, selection of an applet may cause a flag to be set on the controller, which detects the set flag and responds by executing the corresponding action. 'Start' button 482 may cause the controller to initiate operation of the controlled capping devices, with 'stop' button 484 causing such operation to cease. 'Reset' button 486 may set the controlled devices back to a known initial condition. 'Clean' button 488 may cause the capping devices to be subjected to a "clean-in-place" procedure, flushing the machinery without the need for disassembly. 'Cap' button 490 may manually operate the capping mechanisms through a single cycle. Assuming that uncapped bottles are carried to the cappers by means of a conveyor belt or the like, 'jog' button 492 may advance the conveyor one position, shifting a new bottle to each of the cappers. 'Load' button 494 may stop the devices and open a hopper to facilitate loading of additional caps, while 'unload' button 496 may free the current bottles from the capper clamps.

With renewed reference to applets 480, these provide the viewer with an efficient, single-page view of the most critical parameter associated with the cappers. The applets are individually capable of delivering more or different information, however, in response to viewer command. By mouse-clicking on one of the applets, the viewer obtains a configuration property sheet 500 as shown in FIG. 5B. Property sheet 500 is generated by a function embedded within the applet code; it is responsive to viewer input and allows the viewer to reconfigure various aspects of the applet, including:

1. The object and item (state, diagnostic, metric, etc.) being queried within the controller;
2. A button causing a chart to be displayed;
3. The text to display preceding the number ("Station 1 Cap Time:");
4. The text to display following the number ("Milliseconds");
5. The text color and background color; and
6. High and low alarm levels, and the text and background colors to change to if these levels are reached.

Thus, the illustrated property sheet 500 pertains to the Cap_Time parameter of the object Capper. The alarm levels correspond to critical levels in the diagnostic template of the object governing operation of the controller, and their violation results in a visual signal to the viewer. In FIG. 5B, property sheet 500 specifies non-display of an associated chart. If the viewer were to select "Display Chart" with his mouse, the chart 510 shown in FIG. 5C would be displayed. Because the display is capable of showing only a single such chart at any one time, the viewer selects which (if any) of the controlled devices requires further scrutiny at a given instant.

Chart 510, like the applet that generates it, is updated with each new sample obtained from the controller. This illustrates a highly useful applet feature, namely, the ability to automatically accumulate historical data over a predetermined interval at a specified time granularity. Suppose, for example, that chart 510 shows all historical data accumulated by the applet for Station 1 Cap Time at a time granularity of one update/sec. The historical window, as illustrated, is 30 sec. Because anomalies in a controlled machine are frequently revealed more by trends than by an instantaneous "snapshot," the availability of historical data affords the viewer the opportunity to consider present data values in the context of prior peformance. This availability also allows the applet to be programmed with a greater range of alarm functions sensitive to trends as well as current data. Historical data is stored as a rolling FIFO buffer, with the least recent data entry being discarded as an updated data entry is received. In this way, the temporal order of the data samples is preserved, and the number of stored entries, as well as the corresponding time interval to which they relate, remain constant.

Property sheet 500 may allow the viewer to modify other aspects of the associated applet, including its mode of operation. For example, the viewer may be afforded the ability to alter the data update rate, the number of recent samples maintained as historical data, even the mode of presentation (if, for example, the applet has internal instructions for displaying data in different formats). The viewer's modifications of default values may be saved in non-volatile storage on the viewer's computer (e.g., as so-called "cookies") so that the next time he accesses the web page, the applets will run as previously modified.

The HTML code in the web page invoking the applet ordinarily contains default configuration information, which may be modified by stored cookies in the course of applet execution. This approach allows customized controller web pages to invoke applets in a straightforward manner. More specifically, the HTML page requests the Java applet with a series of properties. A representative HTML Java applet request for the applet displays shown in FIG. 5A is as follows:

```
<applet
    code = CTCgetMetric.class
    id = CTCgetMetric
    width = 320
    height = 20>
        <param name = object      value = "Capper">
        <param name = item        value = "Cap_Time">
        <param name = prefix      value = "Station 1 Cap Time:">
        <param name = suffix      value = "Milliseconds">
        <param name = fgcolor     value = "white">
        <param name = bgcolor     value = "blue">
        <param name = fontType    value = "Helvetica">
        <param name = fontSize    value = "14">
</applet>
```

This code sets the size of the box, the Object and Parameter, the colors, associated text, and font type and size. The user can modify these properties through interaction with property sheet 500. These properties are changed only in the viewer's machine, and are not transmitted to the controller/server.

The applet may not only allow the viewer to affect operation of the controller (e.g., by providing input transmitted to the controller, as discussed above), but also to alter the controller object itself. Obviously this capability is reserved to viewers having proper authority (generally remotely located program designers responsible for system configuration and operation). But the applet is straightforwardly (and without undue experimentation) configured to secure access, via the web connection, to the object database and even run-time code.

It will therefore be seen that the foregoing represents a highly extensible and flexible approach to remote access to and presentation of controller information. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An object-oriented controller in which control functionality is encapsulated in objects that may be rendered accessible to a remotely located computer, the controller comprising:

a. an object manager for storing a plurality of objects corresponding to controlled physical entities, each object specifying at least one control function associated with the entity and including, for each function:
        i. at least one executable procedure for performing an action associated with the control function; and
        ii. at least one executable procedure for displaying information associated with the control function, the at least one procedure providing display instructions executable by the remotely located computer and causing display thereon of the information in a predetermined format, wherein
        iii. the procedures are distinct and subject to independent modification;
    b. a performance engine for causing performance of the actions in accordance with the procedures associated therewith; and
    c. a communication module facilitating access to the display procedure by the remotely located computer, such access comprising:
        i. transfer of the display instructions to the remotely located computer upon request; and
        ii. modification of the display procedure in accordance with commands transmitted by the remotely located computer.

2. The controller of claim 1 wherein the display instructions cause the remotely located computer to obtain the information from the controller via a computer network.

3. The controller of claim 2 wherein the computer network is the Internet and data is obtained via the HyperText Transfer Protocol.

4. The controller of claim 2 wherein the display instructions cause the remotely located computer to (i) periodically query the controller to obtain updated controller data, and (ii) display the updated data in accordance with the predetermined format.

5. The controller of claim 1 wherein the instructions comprise a procedure responsive to commands issued to the remotely located computer to reconfigure the display, the procedure causing the information to be displayed in a different format.

6. The controller of claim 5 wherein the procedure further causes the remotely located computer to store data representative of the different format such that subsequent access to the display procedure by the remotely located computer results in display of the information in the different format.

7. The controller of claim 1 wherein the items further comprise a procedure facilitating modification of at least some of the items by the remotely located computer.

8. The controller of claim 1 wherein the items further comprise a procedure responsive to commands issued by the remotely located computer concerning performance of the action by the controller.

9. The controller of claim 4 wherein the display instructions further cause the remotely located computer to store, in addition to the updated data, a plurality of previously obtained data samples in a temporal order.

10. The controller of claim 1 wherein the display instructions further comprise a procedure for detecting an alarm condition and issuing an alert signal in response thereto.

11. The controller of claim 9 wherein the display instructions further comprise a procedure for analyzing the current and previously obtained data samples to detect an alarm condition, and issuing an alert signal in response thereto.

12. The controller of claim 1 wherein the items further include a specification of at least one state associated with the control function, the controller further comprising means for monitoring a resource associated with the action and, based thereon, determining the state specified in the database.

13. The controller of claim 12 wherein the selection and performance means is responsive to executable instructions causing it to respond, in causing performance of the action, to the state determined by the monitoring means.

14. The controller of claim 1 wherein the items further include a list of resources associated with the action, the performance means being configured to establish control connections to the listed action resources to perform the action.

15. The controller of claim 12 wherein the items further include a list of resources associated with the state, the monitoring means being configured to establish monitoring connections to the listed state resources to determine the state.

16. The controller of claim 15 further comprising:
a. an input/output module for connection to at least one input/output point on a controlled machine; and
b. a computer memory comprising a plurality of registers and flags for containing data associated associated with the action, the state resources including the at least one input/output point and the registers and flags.

17. The controller of claim 1 further comprising means for operating an industrial machine, the information comprising quantitative data representative of machine operation.

18. A method of facilitating interaction between a controller and a remotely located computer, the method comprising:
a. defining a plurality of objects corresponding to controlled physical entities, each object specifying at least one control function associated with the entity and including, for each function:
   i. at least one executable procedure for performing an action associated with the control function; and
   ii. at least one executable procedure for displaying information associated with the control function, the at least one procedure providing display instructions executable by the remotely located computer and causing display thereon of the information in a predetermined format, wherein
   iii. the procedures are distinct and subject to independent modification;
b. selecting and performing actions in accordance with the procedures associated therewith; and
c. facilitating access to the display procedure by the remotely located computer by:
   i. responding to a display request by transferring the display instructions to the remotely located computer; and
   ii. responding to a modification command issued by the remotely located computer by modifying the display procedure in accordance therewith.

19. The method of claim 18 further comprising the step of causing the remotely located computer to obtain the information from the controller via a computer network.

20. The method of claim 19 wherein the computer network is the Internet and data is obtained via the HyperText Transfer Protocol.

21. The method of claim 19 wherein the display instructions cause the remotely located computer to (i) periodically query the controller to obtain updated controller data, and (ii) display the updated data in accordance with the predetermined format.

22. The method of claim 18 further comprising the step of causing the remotely located computer to respond to commands to display the information in a different format.

23. The method of claim 22 further comprising the step of causing the remotely located computer to store data representative of the different format such that subsequent display by the remotely located computer occurs in the different format.

24. The method of claim 18 further comprising the step of facilitating modification of at least some of the items by the remotely located computer.

25. The method of claim 18 further comprising the step of causing the controller to respond to commands issued by the remotely located computer concerning performance of the action by the controller.

26. The method of claim 22 further comprising the step of causing the remotely located computer to store, in addition to the updated data, a plurality of previously obtained data samples in a temporal order.

27. The method of claim 18 further comprising the step of detecting an alarm condition and causing the remotely located computer to issue an alert signal in response thereto.

28. The method of claim 26 further comprising the steps of:
a. analyzing the current and previously obtained data samples to detect an alarm condition; and
b. causing the remotely located computer to issue an alert signal in response thereto.

29. The method of claim 18 further comprising the steps of:
a. associating at least one state with the control function; and
b. monitoring a resource associated with the action and, based thereon, determining the state.

30. The method of claim 29 further comprising the step of responding, in performing the action, to the determined state.

31. The method of claim 18 further comprising the steps of:
a. defining a list of resources associated with the action; and
b. establishing control connections to the listed action resources to perform the action.

32. The method of claim 29 further comprising the steps of:
a. defining a list of resources associated with the state; and
b. establishing monitoring connections to the listed state resources to determine the state.

33. The method of claim 18 further comprising the step of operating an industrial machine, the information comprising quantitative data representative of machine operation.

* * * * *